(12) United States Patent
Ubillos et al.

(10) Patent No.: US 7,719,548 B2
(45) Date of Patent: *May 18, 2010

(54) VIEWING DIGITAL IMAGES USING A FLOATING CONTROLLER

(75) Inventors: Randy Ubillos, Los Altos, CA (US); Laurent Perrodin, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/415,831

(22) Filed: Mar. 31, 2009

(65) Prior Publication Data

US 2009/0187858 A1 Jul. 23, 2009

Related U.S. Application Data

(63) Continuation of application No. 10/960,163, filed on Oct. 6, 2004, now Pat. No. 7,557,818.

(51) Int. Cl.
G09G 5/00 (2006.01)
G09G 5/34 (2006.01)

(52) U.S. Cl. ..................................... 345/684
(58) Field of Classification Search .................. 345/684
See application file for complete search history.

(56) References Cited

U.S. PATENT DOCUMENTS

| 4,343,037 A | 8/1982 | Bolton |
| 5,083,860 A | 1/1992 | Miyatake et al. |
| 5,559,707 A | 9/1996 | DeLorme et al. |
| 5,636,036 A | 6/1997 | Ashbey |
| 5,638,523 A | 6/1997 | Mullet et al. |

(Continued)

FOREIGN PATENT DOCUMENTS

EP 1 369 792 A2 12/2003

(Continued)

OTHER PUBLICATIONS

Baudisch, P. et al., "Focus plus context screens: displays for users working with large visual documents", CHI '02: CHI '02 extended abstracts on Human factors in computing systems; Apr. 2002, ACM.

(Continued)

*Primary Examiner*—Javid A Amini
(74) *Attorney, Agent, or Firm*—Hickman Palermo Truong & Becker LLP

(57) ABSTRACT

A method and apparatus for viewing one or more images using a floating controller is provided. A collection of digital images may be managed using a digital image system that displays images using a floating controller. While a pointer is over the floating controller, the floating controller is continuously displayed, but when the pointer is moved off the floating controller, a period of time during which no user input of any type is tracked. If, while the pointer is off the toolbar, an idle period exceeds a predetermined threshold duration, then the floating controller is hidden. A set of images of a bounded sequence of images may be displayed on the floating controller. A visual indication that indicates whether a particular image in the set of images is either the first or last image in the bounded sequence may be displayed on each image of the set of images.

21 Claims, 20 Drawing Sheets

U.S. PATENT DOCUMENTS

| | | | |
|---|---|---|---|
| 5,675,358 | A | 10/1997 | Bullock et al. |
| 5,752,244 | A | 5/1998 | Rose et al. |
| 5,802,492 | A | 9/1998 | DeLorme et al. |
| 6,005,679 | A | 12/1999 | Haneda |
| 6,085,112 | A | 7/2000 | Kleinschmidt et al. |
| 6,101,431 | A | 8/2000 | Niwa et al. |
| 6,184,823 | B1 | 2/2001 | Smith et al. |
| 6,253,218 | B1 | 6/2001 | Aoki et al. |
| 6,321,158 | B1 | 11/2001 | DeLorme et al. |
| 6,509,912 | B1 | 1/2003 | Moran et al. |
| 6,704,034 | B1 | 3/2004 | Rodriguez et al. |
| 6,897,880 | B2 | 5/2005 | Samra |
| 7,091,959 | B1 * | 8/2006 | Clary ............... 345/173 |
| 7,096,117 | B1 | 8/2006 | Gale et al. |
| 7,099,882 | B2 | 8/2006 | McDonough |
| 7,164,423 | B1 | 1/2007 | Westen |
| 7,557,818 | B1 * | 7/2009 | Ubillos et al. ............ 345/684 |
| 7,577,922 | B2 | 8/2009 | Mann et al. |
| 2001/0004268 | A1 | 6/2001 | Kubo et al. |
| 2001/0014184 | A1 | 8/2001 | Bubie et al. |
| 2002/0008721 | A1 | 1/2002 | Fahraeus et al. |
| 2002/0010589 | A1 | 1/2002 | Nashida et al. |
| 2002/0158973 | A1 | 10/2002 | Gomi |
| 2002/0180803 | A1 | 12/2002 | Kaplan et al. |
| 2002/0191867 | A1 | 12/2002 | Le et al. |
| 2003/0084065 | A1 | 5/2003 | Lin et al. |
| 2003/0093445 | A1 | 5/2003 | Schick et al. |
| 2003/0095697 | A1 | 5/2003 | Wood et al. |
| 2003/0123713 | A1 | 7/2003 | Geng |
| 2003/0179154 | A1 | 9/2003 | Demsky et al. |
| 2003/0190090 | A1 | 10/2003 | Beeman et al. |
| 2003/0193525 | A1 * | 10/2003 | Nygaard, Jr. ............ 345/810 |
| 2003/0223650 | A1 | 12/2003 | Kim |
| 2003/0227468 | A1 | 12/2003 | Takeda |
| 2004/0024758 | A1 | 2/2004 | Iwasaki |
| 2004/0111332 | A1 | 6/2004 | Baar et al. |
| 2004/0133927 | A1 | 7/2004 | Sternberg et al. |
| 2004/0139400 | A1 | 7/2004 | Allam et al. |
| 2004/0189827 | A1 | 9/2004 | Kim et al. |
| 2004/0240709 | A1 | 12/2004 | Shoemaker |
| 2005/0010475 | A1 | 1/2005 | Perkowski et al. |
| 2005/0134610 | A1 | 6/2005 | Doyle et al. |
| 2005/0179705 | A1 | 8/2005 | Ubillos et al. |
| 2005/0192924 | A1 | 9/2005 | Drucker et al. |
| 2006/0041613 | A1 | 2/2006 | Fackelmayer et al. |
| 2006/0071942 | A1 | 4/2006 | Ubillos et al. |
| 2006/0071947 | A1 | 4/2006 | Ubillos et al. |
| 2006/0119619 | A1 | 6/2006 | Fagans et al. |
| 2007/0035551 | A1 | 2/2007 | Ubillos |

FOREIGN PATENT DOCUMENTS

| | | | |
|---|---|---|---|
| GB | | 2310988 A | 9/1997 |
| WO | | WO 93/22738 A1 | 11/1993 |

OTHER PUBLICATIONS

Mander, R. et al., "A 'pile' metaphor for supporting casual organization of information"; CHI'92: Proceedings of the SIGCHI conference on Human factors in computing systems; Jun. 1992. ACM.

Ware, C. et al., "TheDragMag image magnifier" May 1995 CHI'95: Conference companion on Human factors in computing systems. Publisher: ACM.

Shneiderman, B. et al., "A photo history of SIGCHI: evolution of design from personal to public, interactions," vol. 9 Issue 3, May 2002, ACM.

European Patent Office, "Communication in pursuant to Article 96(2) EPC", Foreign Application No. PCT/US2005/035943, 8 pages.

Claims, Foreign Application No. PCT/US2005/035943, 5 pages.

Apple Computer Inc., "A 'Pile' Metaphor for Supporting Casual Organization of Information", ACM CHI'92, published May 1992, 8 pages.

Mill, M. et al., "A magnifier tool for video data" Jun. 1992 Proceedings of the SIGCHI conference on Human factors in computing systems. CHI '92 Publisher: ACM Press.

Adobe Systems Incorporated, Windows® 2000, XP®, Adobe® Photoshop® Elements 3.0; The NPD Group/NPD Techworld, Sep. 2003 to May 2004, Publically Available Over The Internet As of Oct. 1, 2004, 16 pages.

European Patent Office, "Communication in pursuant to Article 96(2) EPC", Foreign Application No. PCT/US2005/035938, 7 pages.

Claims, Foreign Application No. PCT/US2005/035938, 4 pages.

International Business Machines Corporation, "Automated/customized method for window tiling", Research Disclosure Database No. 444135, published Apr. 2001, 3 pages.

Graham, A. et al., "Time as essence for photo browsing through personal digital libraries", Proceedings of the $2^{nd}$ ACM/IEEE-CS joint conference on Digital libraries JCDL '02, Jul. 2002, 10 pages.

Rodden, K. et al., "How do people manage their digital photographs?", Proceedings of the SIGCHI conference on Human factors in computing systems. CHI'03, Apr. 2003, 8 pages.

European Patent Office, "Communication pursuant to Article 94(3) EPC", Application No. 05806181.3-1225, dated Apr. 18, 2008, 10 pages.

Claims, Application No. 05806181.3-1225, 5 pages.

Branscombe, M., "Getting to know XP Multimedia", PC Answer, XP-002330622, dated May 2002, 3 pages.

Savil, J., "How can I activate the Filmstrip view for my Windows XP folder?", windowsitpro.com, A web exclusive from FAQ for Windows, Jun. 2002, 2 pages.

European Patent Office, "Communication Pursuant to Article 94(3) EPC", Application No. 05805830.6-1245, received May 28, 2008, 11 pages.

Claims, Application No. 05805830.6-1245, 3 pages.

European Patent Office, "Communication pursuant to Article 94(3) EPC", application No. 05805830.6- 1245, dated Dec. 2, 2009, 5 pages.

International Business Machines Corporation, "Automated/Customized Method for Window Tiling", research disclosure database No. 444135, Kenneth Mason Publications Ltd., Apr. 2001, 3 pages.

* cited by examiner

210 — STORE DATE THAT (A) IDENTIFIES AN ASSOCIATION BETWEEN A PLURALITY OF IMAGES, (B) IDENTIFIES A REPRESENTATIVE IMAGE, AND (C) IDENTIFIES A CURRENT STATE OF THE PLURALITY OF IMAGES

220 — VISUALLY DEPICT THE PLURALITY OF IMAGES WITH ONLY THE REPRESENTATIVE IMAGE WHEN THE CURRENT STATE IS A FIRST STATE

230 — VISUALLY DEPICT THE PLURALITY OF IMAGES WITH TWO OR MORE IMAGES WHEN THE CURRENT STATE IS A SECOND STATE

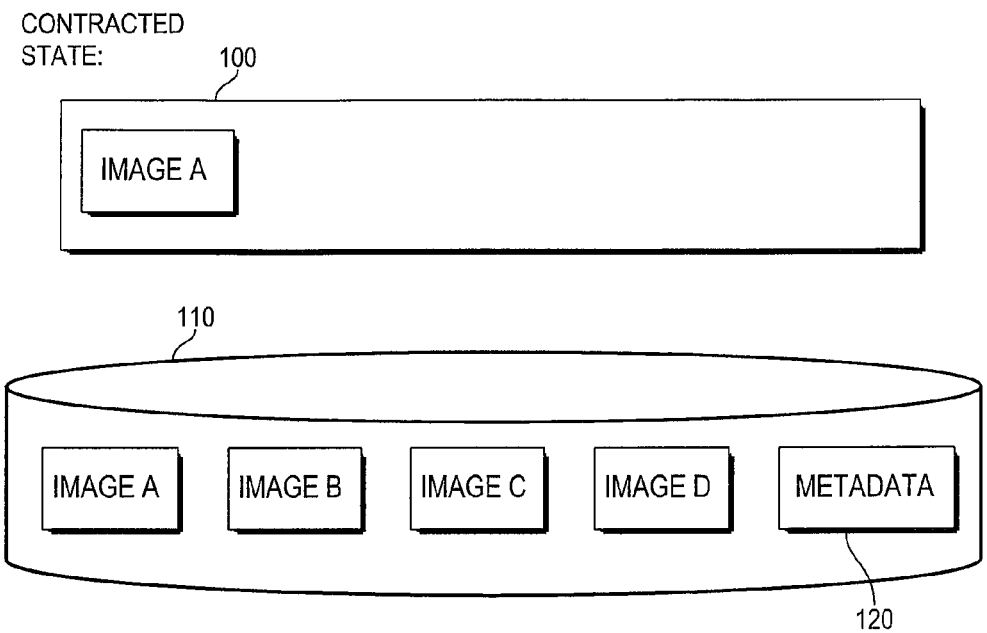
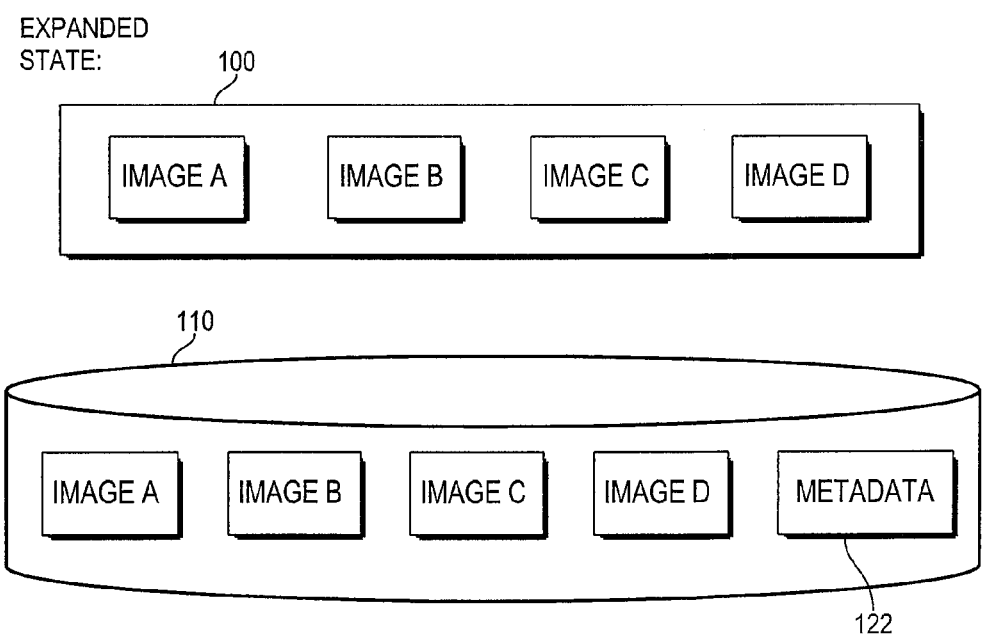
Fig. 3

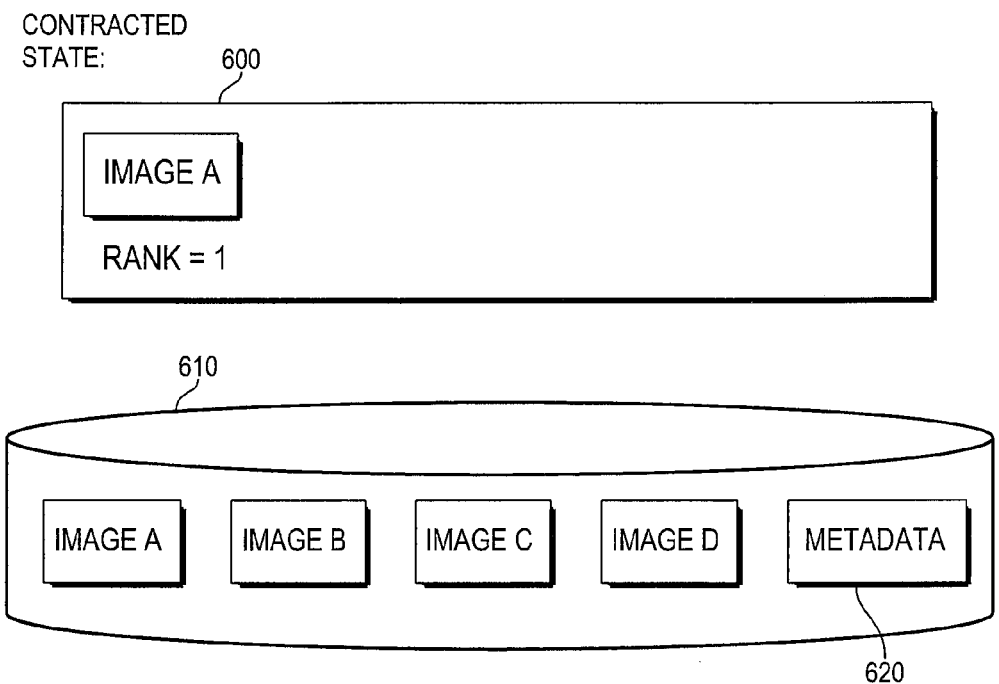
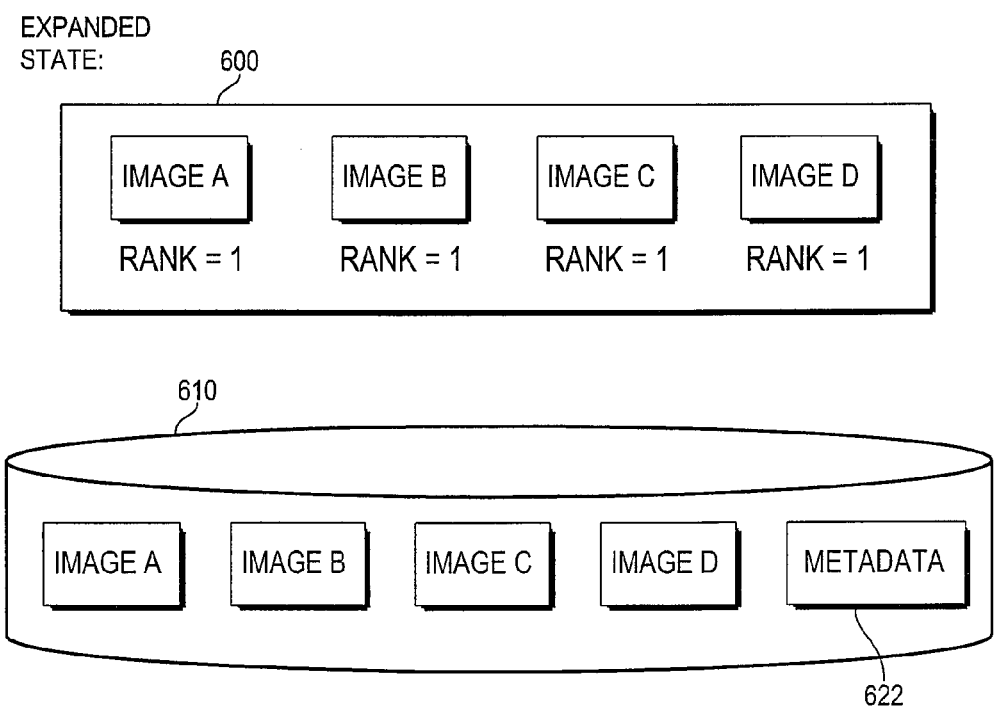
Fig. 6

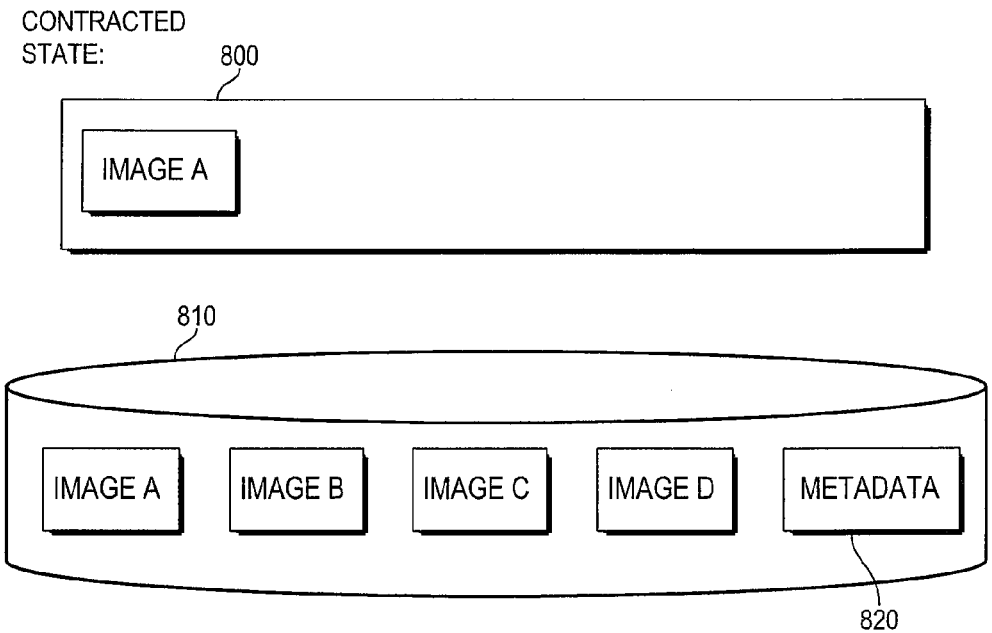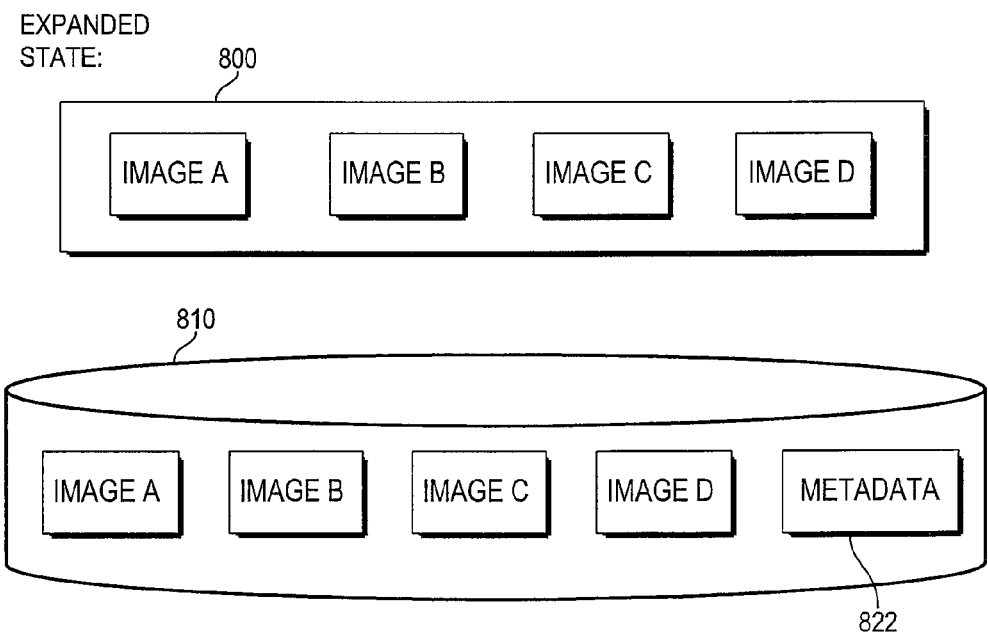
Fig. 8

NESTED GROUPS
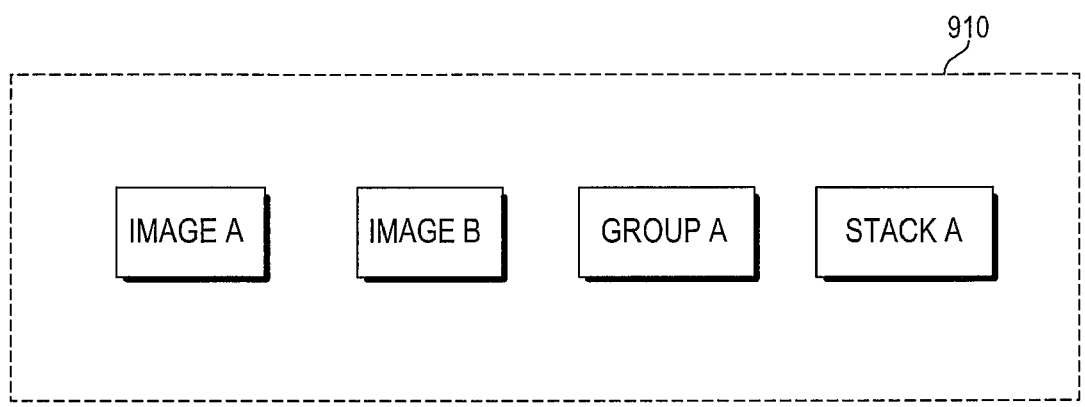
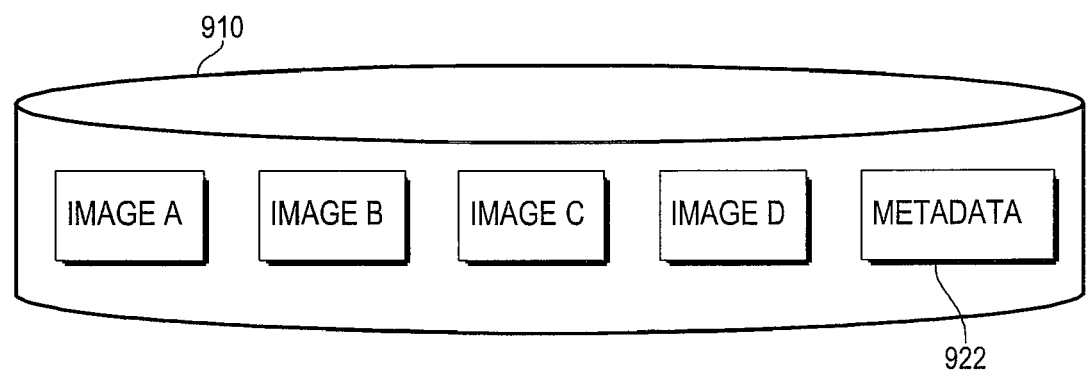
Fig. 9

1010 — DISPLAY, WITHIN A FIRST BOUNDED REGION, A DIFFERENT VISUAL DEPICTION OF VISUAL INFORMATION ENCLOSED WITHIN A SECOND BOUNDED REGION

1020 — CHANGE THE ORIENTATION OF THE FIRST BOUNDED REGION RELATIVE TO THE SECOND BOUNDED REGION IN RESPONSE TO CHANGES OF THE LOCATION OF THE SECOND BOUNDED REGION

|  | COLUMN 1 | COLUMN 2 | COLUMN 3 | COLUMN 4 | COLUMN 5 |
|---|---|---|---|---|---|
| ROW: 1 | IMAGE 1602 | IMAGE 1604 | IMAGE 1606 | IMAGE 1608 | IMAGE 1610 |
| ROW: 2 | IMAGE 1612 | IMAGE 1614 | IMAGE 1616 | IMAGE 1618 | IMAGE 1620 |
| ROW: 3 | IMAGE 1622 | IMAGE 1624 | IMAGE 1626 | IMAGE 1628 | IMAGE 1630 |
| ROW: 4 | IMAGE 1632 | IMAGE 1634 | IMAGE 1636 | IMAGE 1638 | IMAGE 1640 |

*Fig. 16*

VIEWING DIGITAL IMAGES USING A FLOATING CONTROLLER

CROSS-REFERENCE TO RELATED APPLICATIONS

This is a continuation application of application Ser. No. 10/960,163, filed on Oct. 6, 2004, now U.S. Pat. No. 7,557,818, invented by Randy Ubillos and Laurent Perrodin, entitled "Viewing Digital Images Using A Floating Controller," the entire disclosure of which is hereby incorporated by reference as if fully set forth herein. This application is related to co-pending application Ser. No. 10/960,339, filed on Oct. 6, 2004, invented by Randy Ubillos and Stan Jirman, entitled "Viewing Digital Images on a Display Using a Virtual Loupe," and co-pending application Ser. No. 10/960,888, filed on Oct. 6, 2004, invented by Randy Ubillos, Laurent Perrodin, Dan Waylonis, Stan Jirman, Sarah Brody and Mike Mages, entitled "Displaying Digital Images using Groups, Stacks, and Version Sets," and co-pending application Ser. No. 10/960,887, filed on Oct. 6, 2004, invented by Randy Ubillos, Laurent Perrodin and Dan Waylonis, entitled "Techniques for Displaying Digital Images on a Display," the entire disclosures of which are hereby incorporated by reference as if fully set forth herein.

FIELD OF THE INVENTION

The present invention relates to viewing one or more digital images using a floating controller.

BACKGROUND

Digital photographers may use a software system in managing and organizing digital images. Often, digital photographers may need to display a large number of digital images on a display. The number of digital images that the digital photographer wishes to visually represent on the display may be too large or unwieldy for each of the digital images to be visually represented on the display unobstructed. Consequently, there is a need in the art to improve the display, management, and organization of digital images shown on a display.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 is a flowchart illustrating the steps of visually depicting images in a stack, a group, or in a set of versions according to an embodiment;

FIG. 3 is an illustration of the two states of a group containing the digital images shown in FIG. 1 according to an embodiment;

FIG. 6 is an illustration of two states of a stack according to an embodiment;

FIG. 8 is an illustration of the two states of a version set according to an embodiment;

FIG. 9 is an illustration of a group that contains another group and a stack according to an embodiment;

FIG. 10 is a flowchart illustrating the steps of using a virtual loupe according to an embodiment;

FIG. 16 is an illustration of a display of a sequence of digital images arranged in a series of rows according to an embodiment;

DETAILED DESCRIPTION

Figure 1:
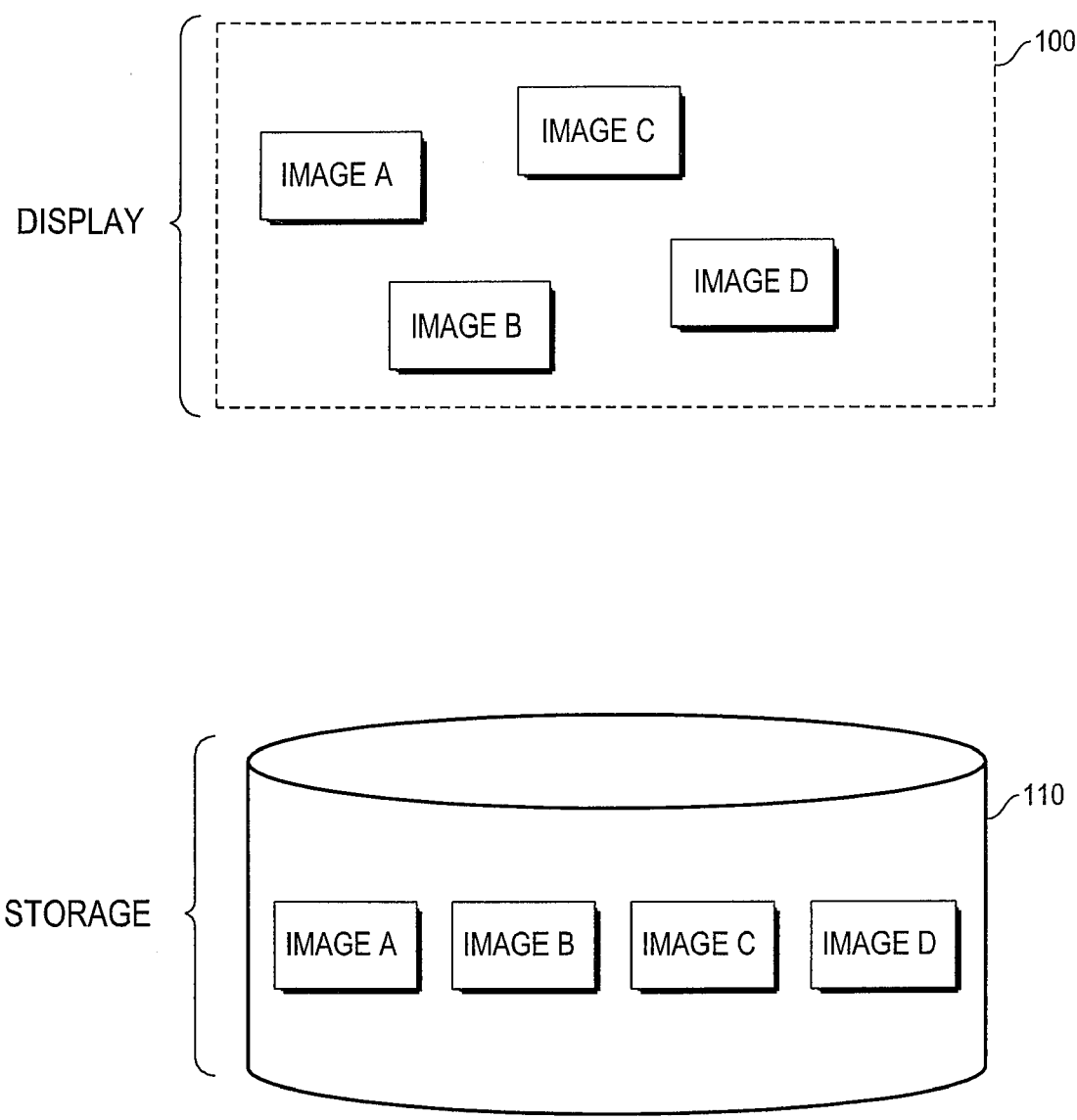
FIG. 1 is an illustration of a display of a digital image system according to an embodiment.

In the following description, for the purposes of explanation, numerous specific details are set forth in order to provide a thorough understanding of the embodiments of the invention described herein. It will be apparent, however, that embodiments of the invention may be practiced without these specific details. In other instances, well-known structures and devices are shown in block diagram form in order to avoid unnecessarily obscuring the embodiments of the invention described herein.

Functional Overview

A digital image system may render a floating controller on a display for presentation to a user. The floating controller may be employed by the user to display one or more digital images on the display. One or more images may be displayed on the floating controller, which, when selected by the user, are displayed on the display. The user may transmit user input to the digital image system to cause the floating controller to be positioned anywhere on the display, including a position that is not adjacent to any edge of the display.

The one or more images displayed on the floating controller may include a bounded sequence of images. When an image is displayed on the floating controller, by the digital image system, that is not either the beginning or end of the bounded sequence of images, a visual indicator may be displayed in a manner associated with the image. The visual indicator may inform the user that the image is not at either the beginning or rend of the bounded sequence of images. In this way, a user may scroll through the bounded sequence of images, and if not all of the bounded sequence of images may be displayed simultaneously on the floating controller, then the user may be informed whether a particular image is at the beginning or end of the bounded sequence of images upon making a visual inspection of the particular image.

The digital image system may cause the floating controller to fade from view on the display after the passage of a configurable amount of idle time if the mouse pointer is not positioned over the floating controller by the user. On the other hand, if the user does position the mouse pointer over the floating controller, then the floating controller is continuously displayed on the display by the digital image system.

Search controls may also be displayed on the floating controller to enable a user to search for one or more images that conform to one or more search terms. The user may transmit user input to the digital image system via the search controls to cause a search to be performed for a set of images that correspond to a particular set of search terms. If the digital image system determines that an image conforms to a particular search term, then an image associated with the particular search term is displayed. If the user selects the displayed image associated with the particular search term, then all images that match the particular search term are displayed by the digital image system.

Ratings controls may also be displayed on the floating controller to enable a user to associate a rating value with one or more images. The user may transmit user input to the digital image system via the ratings controls to associate a ratings value with one or more images. The user may also transmit user input to the digital image system via the ratings controls to cause one or more images that conform to a set of ratings values to be displayed on the display.

Groups, Stacks, and Versions

A user, such as a photographer, may manage and organize a collection of digital images using a digital image system that displays digital images using groups, stacks, and version sets according to one embodiment of the invention. FIG. 1 is an illustration of a display 100 and storage 110 of several digital images by a digital image system, according to one embodiment of the invention. As explained in further detail below, a digital image system may include a computer system that displays one or more digital images upon a display, e.g., display 100 of FIG. 1. As FIG. 1 shows, four different digital images, namely image A, image B, image C, and image D, are visually depicted on display 100. While only four digital images are shown for ease of explanation, display 100 may easily display an unwieldy number of digital images, e.g., two-thousand or more, thus creating difficulties for a user to view and manage all of the digital images shown on display 100.

The images displayed on display 100 are stored in storage 110. Storage 110 may be implemented using any mechanism for storing digital images, e.g., a database, file server, or volatile memory. A digital image stored in storage 110 has a file image resolution, which is the resolution of the digital image when it is stored. Digital images may be displayed at a different level of resolution than that of the file image resolution, e.g., a particular image may be shown magnified resolution level. The level of resolution of a displayed image shall be referred to as the displayed image resolution.

To assist the user in the management and organization of his or her digital images, one or more digital images may be arranged into a group, a stack, or as a version set. FIG. 2 is a flowchart illustrating the steps of visually depicting images in a stack, a group, or as a version set, according to one embodiment of the invention. In step 210, set data is stored that (a) identifies an association between a plurality of images, (b) identifies a representative image, and (c) identifies a current state of the plurality of images. When one or more digital images are arranged into a group, a stack, or as a version set, set data is generated and stored that identifies the one or more digital images and whether the one or more digital images are arranged into a group, a stack, as a version set, or any combination thereof (as explained below, groups and stacks may be nested). The performance of the remainder of steps of FIG. 2 with respect to groups, stacks, and version sets shall be described in further detail below.

Groups

As used herein, a group is a set of unordered digital images that may be visually represented, in a first state, using a representative image, referred to as a "pick image." A group may also be visually represented, in a second state, by displaying all digital images in the group, rather than just the pick image. The pick image of the group, which is displayed on a display, may be used to represent each digital image of the group, thereby reducing the number of digital images displayed on the display.

FIG. 3 is an illustration of two states of a group containing the digital images shown in FIG. 1 according to one embodiment of the invention. As FIG. 3 shows, in a contracted state of the group, only the pick image is displayed, while in an expanded state of the group, each digital image in the group, including the pick image, is displayed. When a group is in the expanded state, the pick image may be displayed in a particular position indicative of the pick image, e.g., the pick image of the group depicted in the expanded state is displayed as the first digital image of the group.

The digital image system may depict images of a group based on metadata stored with the group in storage 110. The metadata stored in storage 110 identifies the group, each image in the group, which image of the group is the representative image (or pick image), and the state of the group. For example, metadata 120, associated with the group in the contracted state, stores data that (a) identifies the group, (b) identifies image A, image B, image C, image D as belonging to the group, (c) identifies the current state as the contracted state, and (d) identifies image A as the pick image. Metadata 122, associated with the group in the expanded state, stores data that (a) identifies the group, (b) identifies image A, image B, image C, image D as belonging to the group, (c) identifies the current state as the expanded state, and (d) identifies image A as the pick image. The digital image system displays images of the group based on the stored metadata associated with the group, e.g., as metadata 120 indicates the group associated with it is in the contracted state, digital image system displays only image A (which is the pick image) on display 100.

In step 220 of FIG. 2, when the current state of the group is a contracted state, the images of the group are visually depicted by displaying only the representative image, or the pick image. For example, as shown by the group in the contracted state depicted in FIG. 3, image A, image B, image C, and image D are represented by visually depicting only image A. In step 230 of FIG. 2, when the current state of the group is the expanded state, the images of the group are visually depicted by displaying two or more images of the plurality of images. For example, as shown by the group in the expanded state depicted in FIG. 3, image A, image B, image C, and image D are represented by visually depicting image A, image B, image C, and image D. Note that in step 230, the images of the group may be visually depicted by displaying less than all of images of the group, as long as two or more images of the group are visually depicted, e.g., in step 230, image A, image B, image C, and image D may be visually depicted by showing only image A and image D.

Changing the Display State of a Group

Figure 4:
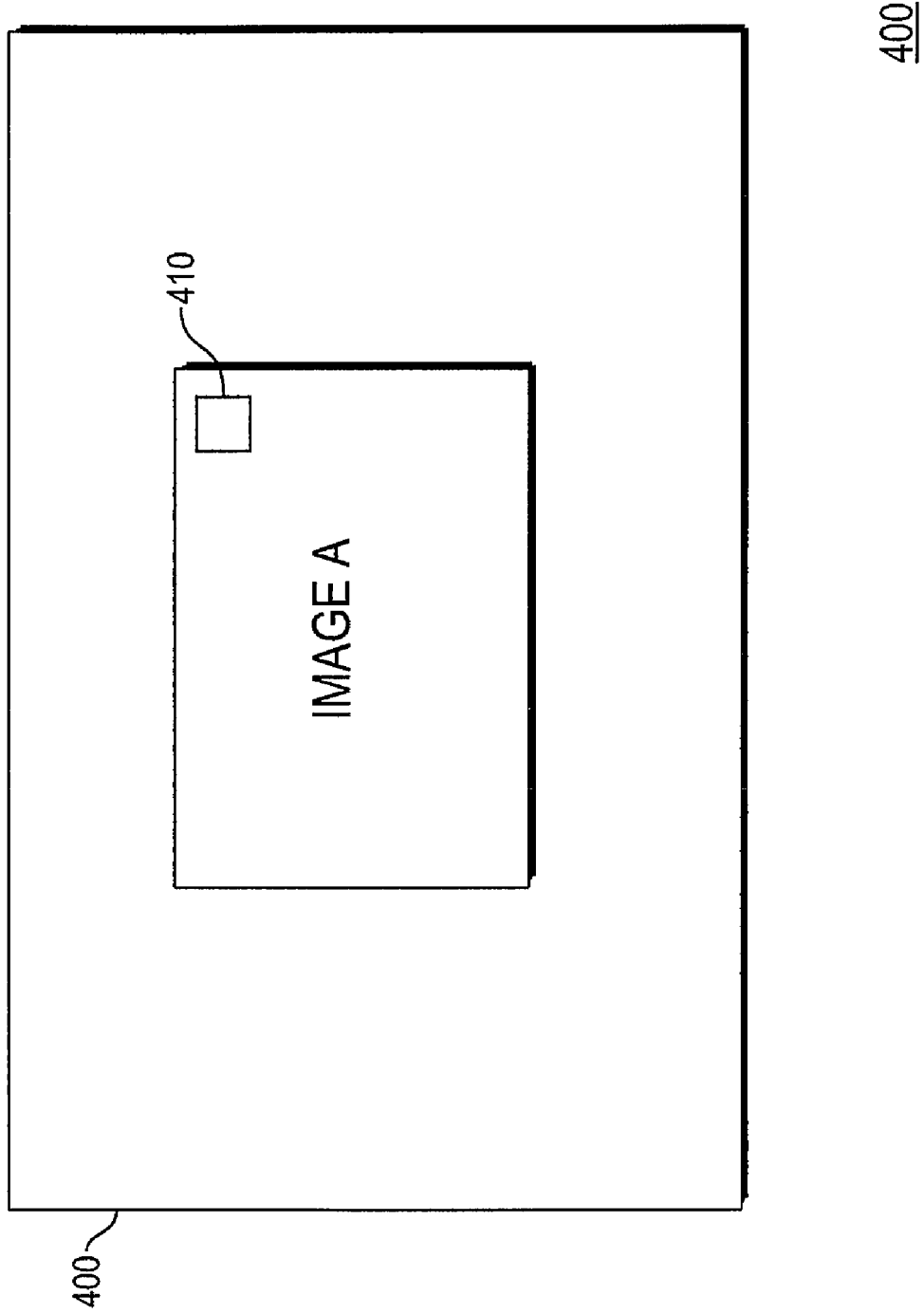
FIG. 4 depicts a display showing a pick image containing a control to change the state of a group according to an embodiment.

A user may change the state of the group between the contract state and the expanded state. In one embodiment of the invention, the state of the group may be changed by the user submitting input to a computer system. Input may be submitted to a computer system by a variety of means, includes one or more sequences of keystrokes or one or more mouse clicks. In a particular embodiment of the invention, the state of the group may be changed by the user selecting a control associated with the group. FIG. 4 depicts a display 400 showing a pick image containing a control 410 to change the state of a group according to one embodiment of the invention. The group of FIG. 4 may be changed from the contract state to the expanded state by the user selecting the control 410 displayed on the pick image of FIG. 4. Control 410 may be implemented using any graphical component that allows a user to select the control, e.g., by clicking on it. Note that the control 410 need not be displayed on the pick image, but rather, may be displayed anywhere on a screen visible to a user, e.g., control 410 may be displayed on a toolbar. Accordingly, control 410 may be implemented using any mechanism for receiving user input, such as one or more sequences of keystrokes or one or more mouse clicks.

When the state of a group is changed, the number of digital images that are visually represented on the display is changed (i.e., either the pick image is shown or two or more digital images of the group are shown). The process of changing the number of digital images that are visually represented on the display may be performed in a manner that allows the user to visualize what is happening to the group. One way to accomplish this is to provide an animation showing the change in the number of digital images visually depicted by the group to allow the user to understand that the state of the group has changed. In other words, in order to avoid confusing a viewer by changing the visual depiction of the group instantaneously when the state of the group is changed, the change in the visually depiction of the group may occur over a noticeable period of time to allow the user to fully comprehend the change in state of the group by watching the change on the display. For example, one or more intermediate states of the group may be displayed as the group transitions from the visual depiction of contracted state to the visual depiction of the expanded state.

Changing the Pick Image of a Group

The user may change the pick image of the group. User input to change the pick image of a group may be submitted via a variety of mechanisms, including input device 2014 and cursor control 2016. When a group is displayed in the expanded state, the pick image of the group may be displayed in such a way as to allow the viewer to visually determine which image of the group is the pick image. For example, the pick image of a group in the expanded state may be displayed with a visual indicator, such as a border, shading, or highlighting, to indicate to the viewer that which image of the group is the pick image.

When a new image for a group in the expanded state is identified by the user as a new pick image, the new image may be displayed with a visual indicator to indicate that the new image is now the pick image, and the prior pick image may cease to be displayed with the visual indicator. It is not necessary for any of the images of a group in the expanded state to move on the display when a new pick image for the group is selected by the user, i.e., the new pick image may be displayed with the visual indicator without moving the new pick image. The change in the pick image of the group in the expanded state may be performed in a manner that allows the user to visualize what is happening to the group.

Stacks

Stacks may also be used to manage and organize digital images. A stack, as used herein, is a set of ordered digital images. Similar to groups, stacks may be visually represented, in a contracted state, using a representative image (or pick image), and in an expanded state in which all digital images associated of the stack are displayed. FIG. 6 is an illustration of two states of a stack according to one embodiment of the invention. Each digital image in a stack has a rank, and each digital image in the stack is depicted in order of its rank. For example, in the stack in the expanded state as shown in FIG. 6, pick image A has the highest rank, image B has the next highest rank, image C has the next highest rank, and so on.

The digital image system may depict images of a stack based on metadata stored with the stack in storage 610. The metadata stored in storage 610 identifies the stack, each image in the stack, which image of the stack is the representative image (or pick image), the rank of each image in the stack, and the state of the stack. For example, metadata 620, associated with the stack in the contracted state, stores data that (a) identifies the stack, (b) identifies image A, image B, image C, image D as belonging to the stack, (c) identifies the current state of the stack as the contracted state, (d) identifies a rank associated with each image of the stack, and (e) identifies image A as the pick image. Metadata 122, associated with the stack in the expanded state, stores data that (a) identifies the stack, (b) identifies image A, image B, image C, image D as belonging to the stack, (c) identifies the current state of the stack as the expanded state, (d) identifies a rank associated with each image of the stack, and (e) identifies image A as the pick image. The digital image system displays images of the stack based on the stored metadata associated with the stack, e.g., as metadata 620 indicates the stack associated with it is in the contracted state, digital image system displays only image A (which is the pick image) on display 600.

Returning again to FIG. 2, in step 220, when the current state of a stack is the contracted state, the images of the stack are visually depicted by displaying only the representative image, or the pick image. For example, as shown by the state in the contracted state depicted in FIG. 6, image A, image B, image C, and image D are represented by visually depicting only image A.

In step 230 of FIG. 2, when the current state of the stack is the expanded state, the images of the stack are visually depicted by displaying two or more images of the stack in order of the rank associated with each displayed image. For example, as shown by the images in the stack in the expanded state depicted in FIG. 6, image A, image B, image C, and image D are represented by visually depicting image A, image B, image C, and image D. Note that in step 230, the images of the stack may be visually depicted by displaying less than all of images of the stack, as long as two or more images of the stack are visually depicted, e.g., in step 230, image A, image B, image C, and image D may be visually depicted by showing only image A and image B. When the stack is in the expanded state, images are shown in order of the rank associated with each displayed image. For example, in the stack in the expanded state depicted in FIG. 6, image A (which is first) has the highest rank, image B (which is displayed next) has the next highest rank, and so on.

In one embodiment of the invention, the state of the stack may be changed by the user selecting a control associated with the stack, e.g., a control similar to control 410 of FIG. 4. In another embodiment of the invention, the state of the group may be changed by the user submitting input to a computer system. Input may be submitted to a computer system by a variety of means, includes one or more sequences of keystrokes or one or more mouse clicks.

Promoting Images in a Stack

Digital images in the stack may be promoted to a higher rank or demoted to a lower rank. A user may use a stack to decide which digital image in a set of related digital images is his or her favorite by promoting favored digital images in the stack, and demoting unfavored digital images in the stack. A user may cause a particular image in the stack to be promoted or demoted by selecting a control on the particular image, similar to control 410 of FIG. 4.

Figure 7:
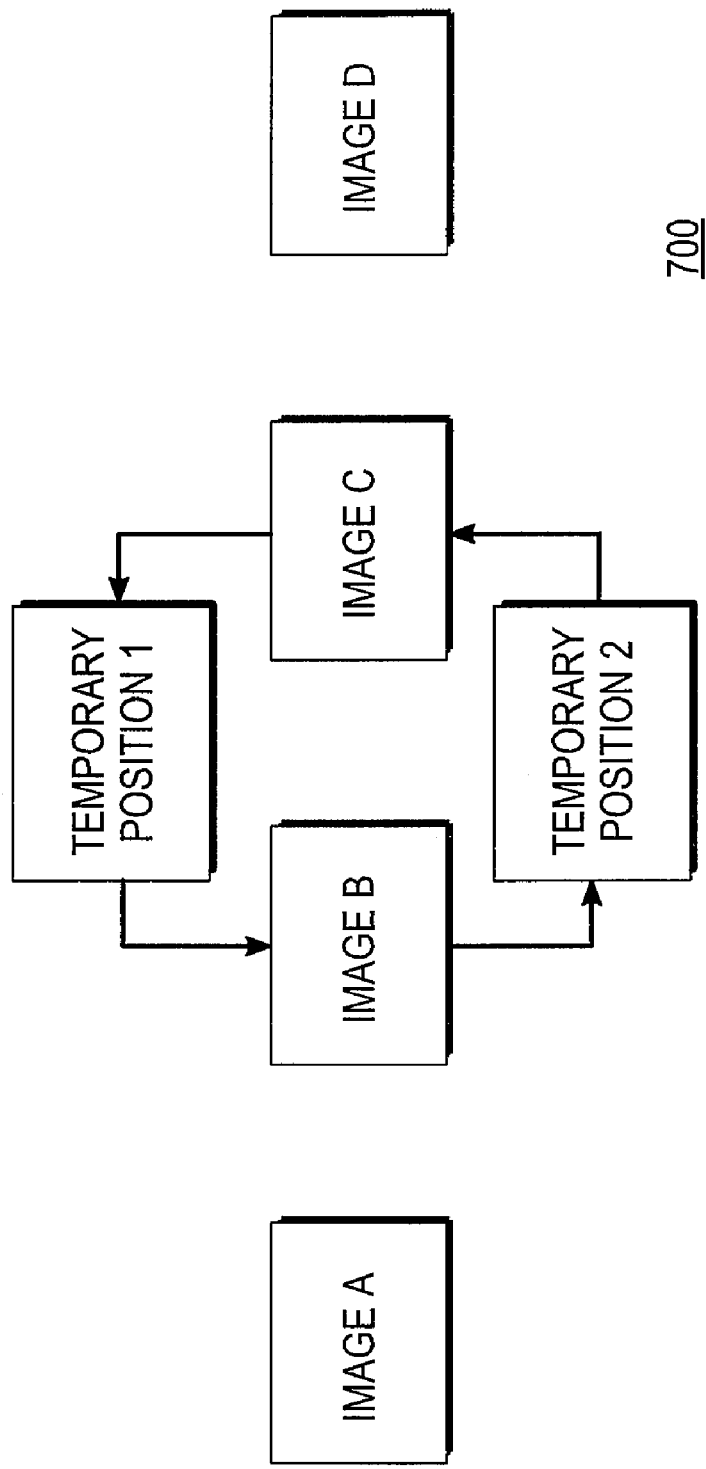
FIG. 7 illustrates the movement of images in a stack when an image in the stack is promoted according to an embodiment.

When an image in a stack is promoted or demoted, the visual display of the stack may be updated in a manner that allows the user to visualize the change in the order of images in the stack. FIG. 7 is an illustration 700 of the movement of images in a stack when an image in the stack is promoted according to one embodiment of the invention. As shown in FIG. 7, image C is promoted, thereby causing it to have a higher rank than image B. Consequently, image C is shown to move from its current location to the location formerly held by image B by passing through one or more intermediate locations, such as temporary position 1. Image B may also be shown to move from its current location to the location currently occupied by image C by passing through one or more intermediate locations, such as temporary position 2. In this way, the user may fully comprehend the change in the order of images in the stack by watching the movement of the members of the stack. When an image in the stack is promoted or demoted, the metadata associated with the stack is updated to reflect the changing in ranking of each image of the stack.

Changing the Pick Image of a Stack

Figure 5:
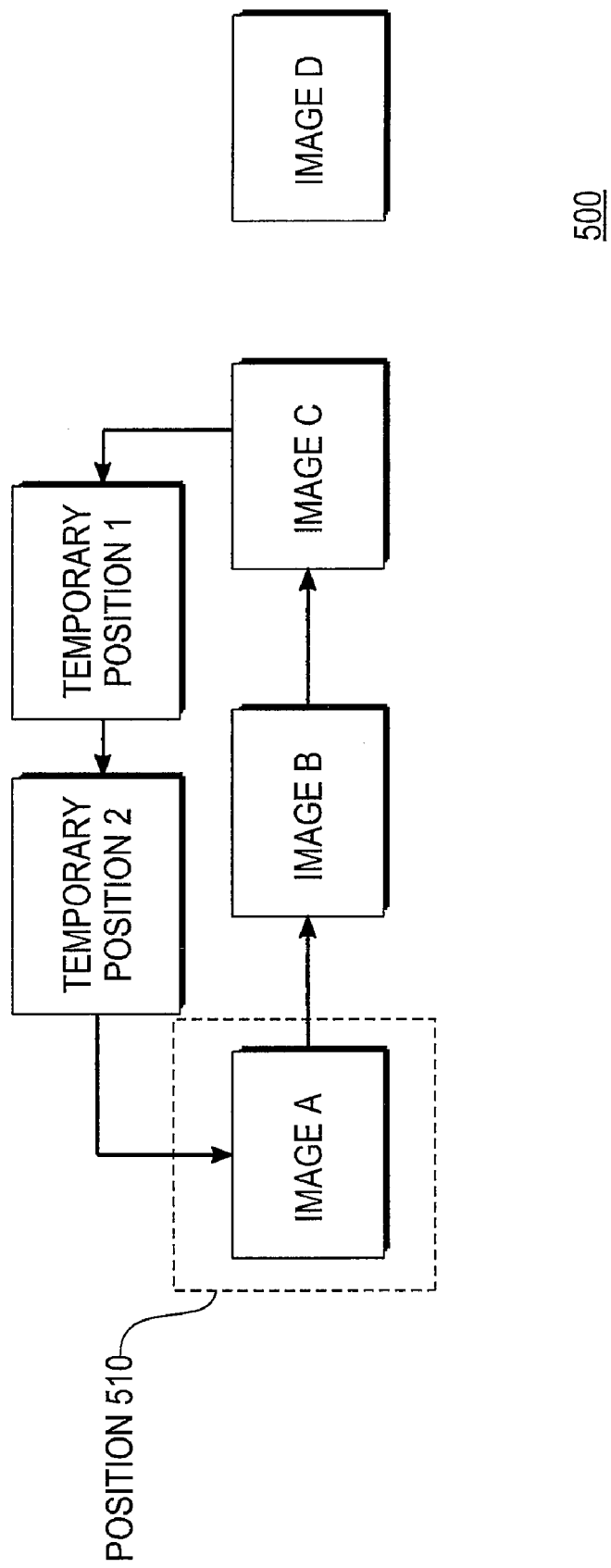
FIG. 5 is an illustration depicting a change in the pick image of a stack according to an embodiment.

The user may change the pick image of a stack. FIG. 5 is an illustration 500 depicting a change in the pick image of a stack according to one embodiment of the invention. FIG. 5 shows the result of receiving user input to cause image C to be the pick image of the stack. The pick image is displayed in position 510, which is currently occupied by image A. User input may be submitted via a variety of mechanisms, including input device 2014 and cursor control 2016. When a new pick image of a stack is identified by the user, the new pick image is promoted to the first position of the stack, and other images in the stack remain in their same relative order. The change in the pick image may be performed in a manner that allows the user to visualize what is happening to the group.

For example, as FIG. 5 illustrates, image C may be shown to move from its current location to position 510 by passing through one or more intermediate locations, such as temporary position 1 and temporary position 2. After image C is promoted to position 510, images A, B, and D remain in the same relative order with respect to each other. Thus, images A and B may be shifted a position to the right on the display to visually represent their change in relative position within the stack. Image A may be shown to move from its current location to the location occupied by image B by passing through one or more intermediate locations. Image B may be shown to move from its current location to the location previously occupied by image C by passing through one or more intermediate locations. In this way, the user may fully comprehend the change in the pick image of the group by watching the movement of the digital images of the group on the display.

Versions

According to one embodiment, two or more digital images may be established as a version set. A version set refers to a set of related digital images that may be visually represented, in a first state, using a representative image (or pick image), and in a second state by each digital image associated of the set. Version sets are similar to groups, except that the images in the version set are derived, directly or indirectly, from the same original digital image. For example, a user may wish to modify an original image to create a derived image. According to one embodiment, each derived image automatically becomes a member of the version set of the image from which it is derived. For example, if a user created a black and white copy of an original image that is in color, the black and white copy and the original image are automatically associated in a version set. Thus, a version set includes the original image and any derived images created from the original image.

FIG. 8 is an illustration of two states of a set of versions according to one embodiment of the invention. As shown in FIG. 8, image A is the original version, and image B, image C, and image D where each derived from image A. As FIG. 8 shows, the contracted state of the version set only displays the pick image (image A), while the expanded state of the version set displays each digital image in the version set, including the pick image. When a set of versions is in the second state, the pick image may be displayed in a particular position, e.g., the pick image may be displayed as the first digital image of the group. For example, as shown in FIG. 8, image A is the pick image, and the pick image is the first digital image displayed in the group. The images of version set in the expanded state may be listed in chronological order, e.g., the user may have created image A most recently, next to image B, and so on.

Returning again to FIG. 2, in step 220, when the current state of the set of versions is in the first state, the images of the version set are visually depicted by displaying only the representative image, or the pick image. For example, as shown by the contracted state depicted in FIG. 8, image A, image B, image C, and image D are represented by visually depicting only image A. In step 230 of FIG. 2, when the current state of the version set is in the expanded state, the images of the version set are visually depicted by displaying two or more images of the version set.

For example, as shown by the version set in the expanded state depicted in FIG. 8, image A, image B, image C, and image D are represented by visually depicting image A, image B, image C, and image D. Note that in step 230, the images of the version set may be visually depicted by displaying less than all of the images of the version set, as long as two or more images of the version set are visually depicted, e.g., in step 230, image A, image B, image C, and image D may be visually depicted by showing only image A and image B. The state of the version set may be changed by the user selecting a control associated with the version set, e.g., a control similar to control 410 of FIG. 4.

The digital image system may depict images of a version set based on metadata stored with the version set in storage 810. The metadata stored in storage 810 identifies the version set, each image in the version set, which image of the version set is the representative image (or pick image), and the state of the version set. For example, metadata 820, associated with the version set in the contracted state, stores data that (a) identifies the version set, (b) identifies image A, image B, image C, image D as belonging to the version set, (c) identifies the current state of the version set as the contracted state, and (d) identifies image A as the pick image. Metadata 822, associated with the version set in the expanded state, stores data that (a) identifies the version set, (b) identifies image A, image B, image C, image D as belonging to the version set, (c) identifies the current state of the version set as the expanded state, and (d) identifies image A as the pick image. The digital image system displays images of the version set based on the stored metadata associated with the version set, e.g., as metadata 820 indicates the version set associated with it is in the contracted state, digital image system displays only image A (which is the pick image) on display 800.

According to one embodiment of the invention, the amount of data needed to represent an image (a derived image) that is derived from another image (the original image) may be minimized if the derived image was created using an internal application. An internal application is any application that makes available data that identifies one or more changes made to the original image to create the derived image. If a derived image was created by an external application (which is any application that is not an internal application), then data is stored that identifies the particular image. Since the derived image was created by an external application, data that identifies one or more changes made to the original image to create the derived image is not available; consequently the entire derived image is stored. However, if the particular image was created by an internal application, then data is stored that identifies one or more changes made to an original image to create the derived image. In this case, the derived image may be created as needed by applying the data that identifies one or more changes made to the original image. A set of versions may include a first portion of images that were created by an external application, and a second portion of images there were created by an internal application.

Drag and Drop Operations

A drag and drop operation produces different results depending on whether the entity involved is a stack, group, or a version set. Upon a user initiating a drag and drop operation on a stack from a first location of a display to a second location of a display, the digital image system records data in a storage device that identifies a copy of the pick image of the stack in the second location. Upon a user initiating a drag and drop operation on a group from a first location of a display to a second location of a display, the digital image system records data in a storage device that identifies a copy of each image of the group in the second location. Upon a user initiating a drag and drop operation on a version set from a first location of a display to a second location of a display, the digital image system records data in a storage device that identifies a copy of the pick image of the version set in the second location.

An operation, initiated by the user, that affects the visual display of an image, is performed differently depending on whether the user initiates the operation on a stack, group, or a version set. For an operation specified by the user to be performed on a stack, the digital image system performs the operation on the pick image of the stack. For an operation specified by the user to be performed on a group, the digital image system performs the operation on all the images of the group. For an operation specified by the user to be performed on a version set, the digital image system performs the operation on the pick image of the version set.

Nested Containers

Stacks, groups, and version sets may be a nested. A group may include members which are themselves stacks, groups, and/or version sets. A stack may include members which are themselves stacks and/or version sets. FIG. 9 is an illustration 900 of a group that contains another group and a stack according to one embodiment of the invention. A shown in FIG. 9, group 910 contains image A, image B, group A, and stack A. Group A may itself contain one or more stacks, groups, and/or version sets. Stack A may also contain one or more stacks, groups, and/or version sets.

The digital image system visually depicts the nested group of FIG. 9 based on metadata 922 stored with the nested group in storage 910. The metadata 922 identifies the stack, each image, group, stack, or version set in the stack, which image, group, stack, or version set of the stack is the representative image (or pick image), and the state of the group. If group 910 was instead a stack, metadata 922 would also identify the rank of each image, group, stack, or version set in the stack. The digital image system displays images of the stack based on the stored metadata associated with the nested entity. Each group, stack, or version set within a group or set may be expanded or contracted. When the pick image of a group or stack (the parent) is itself a group, stack, or version set (the child), then the pick image of the child is used by the digital image system as the pick image of the parent when the parent is in the contracted state.

Nested stacks and groups may be advantageous when managing multiple related images. For example, some digital cameras may take multiple pictures each time a user presses the shutter of the digital camera, e.g., to capture a high-speed action shot. It would be advantageous to associate each set of images taken by the camera each time the user takes a picture in a single group or stack. This way, the user may later review the images in the group or stack with greater ease, as it is likely the user may only wish to ultimately use one digital image in the group or stack.

A set of images may be automatically assigned to a group, stack, or version set by the digital image system based on information associated with the set of images. When a set of images is assigned to group, stack, or version set, metadata that identifies the set of images and the entity (group, stack, or a version set) to which the set of images are assigned is stored in a storage device. Such metadata may be generated automatically during various activities, such as exposure bracketing and sequencing. Exposure bracketing involves taking multiple pictures of similar subject matter at different times using different exposures. Sequencing involves taking multiple pictures contemporaneously in time.

If a set of images were each taken contemporaneously in time, each of the set of images may be assigned to the same group by the digital image system using the generated metadata. In another example, if a set of images of similar subject matter were taken using different exposures, each of the set of images may be assigned to the same group by the digital image system using the generated metadata. In yet another example, if a derived image is created from an original image, then the original image and the derived image may be assigned to the same version set by the digital image system. Thus, a digital image system may assign a set of images to a group, stack, or version set based on the characteristics of the set of images as described in the metadata. The digital image system of other embodiments of the invention may be configured to assign a set of images to either a group, stack, or version set based on additional characteristics of the set of images described in the metadata not presented above in an example, as any characteristic of the set of images described in the metadata may determine whether the set of images is assigned to a group, stack, or version set.

Use of the Virtual Loupe

The digital image system of one embodiment of the invention may be used to view a digital image shown on a display using a virtual loupe. The lens region of the virtual loupe may automatically change in orientation with respect to the target region on the display, as the user causes the target region to change locations on the display, to ensure that the display of the lens region is always unobscured on the display.

Figure 11:
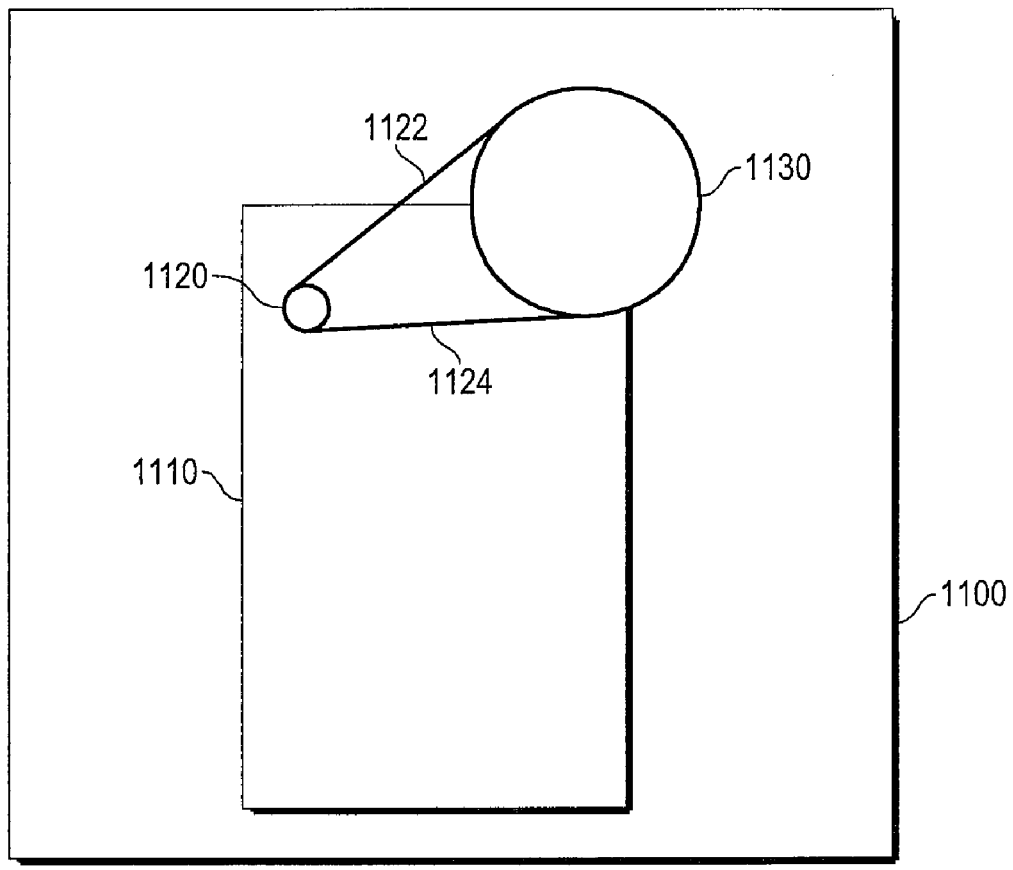
FIG. 11 is an illustration of a display showing a virtual loupe according to an embodiment of the invention.

FIG. 11 is an illustration of a display 1100 showing a virtual loupe according to one embodiment of the invention. FIG. 11 shows a display 1100 that visually represents a digital image 1110. The virtual loupe comprises a target region 1120 and a lens region 1130. Visual information identified by target region 1120 is displayed within the lens region 1130. Target region 1120 may identify visual information by pointing to the visual information or by enclosing the visual information within the target region 1120.

The virtual loupe of FIG. 11 includes line 1122 and line 1124. Line 1122 and line 1124 may either be opaque, transparent, or alpha-blended. The area bounded by line 1122, lens region 1130, line 1124, and target region 1120 may either be opaque, transparent, or alpha-blended. In a particular embodiment, line 1122 and line 1124 may be transparent, and the area bounded by line 1122, lens region 1130, line 1124, and target region 1120 may be transparent, to advantageously allow a photographer to view visual information, identified by target area 1120, in lens region 1130 in a manner that minimizes the amount that the display 1100 is obscured.

FIG. 10 is a flowchart illustrating the steps of using a virtual loupe according to one embodiment of the invention. In step 1010 of FIG. 10, within a first bounded region on a display, a different visual depiction of visual information enclosed within a second bounded region on the display is displayed. The first bounded region and the second bounded region are enclosed within a third bounded region. The first bounded region corresponds to the lens region 1130, the second bounded region corresponds to the target region 1120, and the third bounded region corresponds to the display 1100.

Target region 1120 and lens region 1130 may both be of any shape and size, including circular. In one embodiment of the invention, target region 1120 and lens region 1130 are the same shape. In another embodiment of the invention, target region 1120 and lens region 1130 are a different shape. Target region 1120 and lens region 1130 may each have either an opaque border, transparent border, or an alpha-blended border. An object that is alpha-blended, as used herein, is displayed such that is partially transparent.

In one embodiment of the invention, target region 1120 may be implemented such that target region 1120 outlines the area to be viewed in lens region 1130 without obscuring the area, such as a circle with an opaque border and a transparent center. In another embodiment, target region 1120 is implemented using a movable visual indicator (such as an arrow or a crosshair). The visual information identified by target region 1120 would, at least in part, be obscured by the movable visual indicator, unless the movable visual indicator is alpha-blended. Thus, in such an embodiment, it is advantageous to make the movable visual indicator partially transparent through the use of alpha-blending.

The display image resolution of visual information of an image presented in the lens region 1130 may be different than the file image resolution for that image. In one example, the display image resolution of an image may be a magnified relative to the file image resolution for that image. In another example, image 1100 may be generated based on a stored image, the image 1100 may be shown on display 1100 at a lower resolution or higher resolution than the file image resolution for image 1100, and the lens region 1130 may depict visual information at the same resolution as the file image resolution for image 1100. In this example, the user may view visual information in lens region 1130 that corresponds to the exact resolution of image 1130. In another example, lens region 1130 may depict visual information at a higher-resolution that the file image resolution for image 1100.

The user may configure the virtual loupe to display visual information at different levels of resolution. For example, the user may configure the virtual loupe to display visual information from a higher or lower resolution as image 1110 to depicting visual information at the same resolution as image 1110. In another example, the user may configure the virtual loupe to display visual information from the same resolution as image 1110 to depicting visual information at a higher or lower resolution as image 1110.

When a user moves target region 1120 from a first region that is displayed at a first resolution to a second region that is displayed at a different resolution than the first region, the size of the target region 1120 changes without changing the level of magnification of visual information displayed in the lens region 1130. As target region 1120 identifies a portion of an image of which visual information associated with that portion is displayed in lens region 1130, if the amount of visual information that the lens region 1130 can depict changes (for example, target region 1120 moves over an area of lower resolution than of a prior area), then the size of target region 1120 will change (as visual information enclosed by target region 1120 is depicted in lens region 1130) to identify the new area of visual information that may be depicted by lens 1130.

Alternately, the target region 1120 may remain fixed in size, and the lens region 1130 may change in size to account for a change in the amount of visual information that may be depicted by lens region 1130. For example, if target region 1120 moves over an area of lower resolution than of a prior area, then the size of target region 1120 remains fixed, but lens region 1130 will shrink in size to account for the decreased amount of visual information to depict. Thus, when target region 1120 is moved to identify a portion of visual information at a different level of resolution than previously identified, either target region 1120 or lens region 1130 may change in size to account for the change in the amount of visual information that may be depicted by lens region 1130.

Automated Orientation Adjustment

In step 1020 of FIG. 10, when a user moves target region 1120 within display 1100, the orientation of the lens region 1130 may be changed relative to the target region 1120. Step 1020 is performed to ensure that lens region 1130 is always displayed on display 1100.

Figure 12:
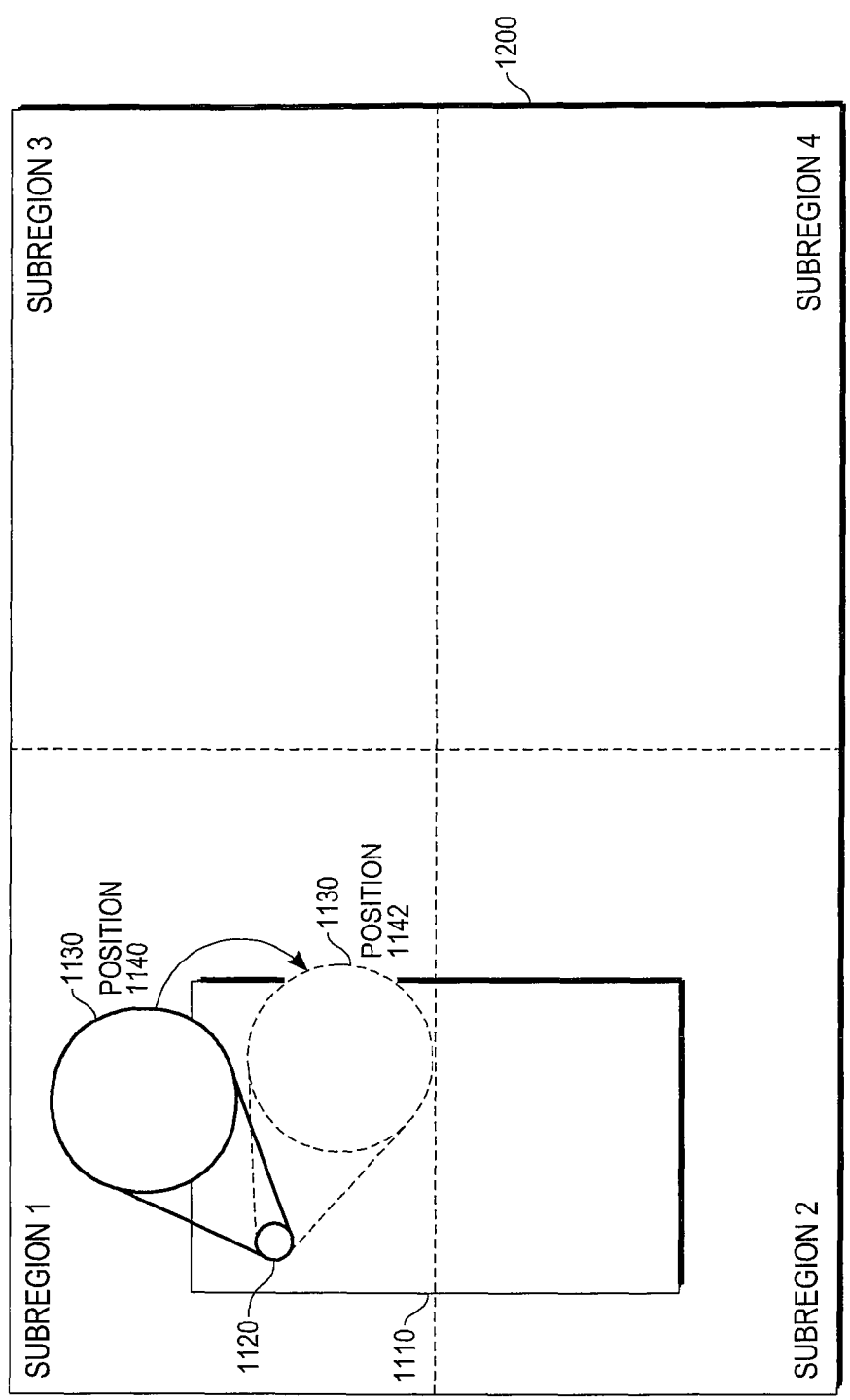
FIG. 12 is a depiction of changing the orientation of the virtual loupe according to an embodiment of the invention.

FIG. 12 is a depiction of changing the orientation of the virtual loupe on a display 1200 according to one embodiment of the invention. As FIG. 12 depicts, in response to the user moving the location of target region 1120, the digital image system causes the lens region 1130 to move from position 1140 to position 1142. The user may move the location of target region 1120 by submitting user input to digital image system by a variety of mechanisms, e.g., input device 2014 and cursor control 2016.

The digital image system maintains data that describes the location of target region 1120 and lens region 1130. The user may cause the target region 1120 to move over the display 1100 by submitting user input to the digital image system using input device 2014 and/or pointer control 2016. The lens region 1130 moves in accordance with the target region 1120, e.g., if the target region 1120 is moved on the display two inches to the left, then the lens region 1130 is moved on the display two inches to the left. When the digital image system detects that the user has submitted user input that includes instructions to change the location of target region 1120, digital image system (a) updates the data that describes the location of target region 1120 to reflect the location identified by the user input, and (b) updates the display of the target region 1120 to reflect the new location. Similarly, when the lens region 1130 is moved by the digital image system, the digital image system (a) updates data that describes the location of lens region 1130 on display 1200, and (b) updates the display 1200 to reflect the new location of lens region 1130.

In embodiments of the invention, the digital image system ensures that the lens region 1130 is always viewable on the display, regardless of where the target region 1120 is positioned on the display. When the digital image system detects that the target region 1120 is approaching the edge of display 1100, the digital image system determines if the lens region 1130 is closer to the edge of the display 1100 than the target region 1120. If the lens region 1130 is closer to the edge of the display 1100 than the target region 1120, then the digital image system (a) changes the orientation on the display between the target region 1120 and the lens region 1130 so that the target region 1120 is closer to the edge of the display 1100 than the lens region 1130, and (b) updates the data that describes the location of lens region 1130 to reflect the new position of the lens region 1130. While the orientation of lens region 1130 is changing, the lens region 1130 continues to depict the same visual information of image 1110. By changing the orientation of the lens region 1130 with respect to the target region 1120, the digital image system ensures that the lens region 1130 is always viewable on the display.

In one embodiment, the digital image system determines what the new position of the lens region should be by (a) maintaining a constant distance between the lens region 1130 and the target region 1120, and (b) changing the orientation of the lens region 1130 with respect to the target region 1120 to be aligned with the center of display 1200, e.g., lens region 1130 is moved from position 1140 to position 1142 as shown in FIG. 12.

In another embodiment, the digital image system determines what the new position of the lens region should be using a plurality of subregions. The digital image system maintains data that divides the display 1200 into a plurality of subregions, e.g., the digital image system may maintain data that divides display 1200 into four subregions as shown in FIG. 12. The division of each subregion need not be visually presented to the user. Step 1020 is performed by digital image system by determining the orientation between the target region 1120 and the lens region 1130 based on which subregion of display 1100 in which the target region 1120 is located. When digital image system changes the orientation between the target region 1120 and the lens region 1130, the digital image system maintains the same distance between the target region 1120 and the lens region 1130.

When the digital image system determines that the lens region 1130 should change orientation, the digital image system changes the orientation of the lens region 1130 to be pointed in a particular direction associated with the subregion in which the lens region is located. For example, anytime a lens region 1130 changes orientation in subregion 1, the digital image system may change the orientation of lens region 1130 such that the lens region 1130 is more or less south-east of target region 1120. As shown in FIG. 12, as lens region 1130 is in subregion 1, when lens region 1130 changes orientation, lens region 1130 is rotated such that lens region 1130 is more or less south-east of target region 1120 to ensure that the lens region 1130 is fully depicted on display 1200.

In another example, anytime a lens region 1130 changes orientation in subregion 2, the digital image system may change the orientation of lens region 1130 such that the lens region 1130 is more or less north-east of target region 1120. In another example, anytime a lens region 1130 changes orientation in subregion 3, the digital image system may change the orientation of lens region 1130 such that the lens region 1130 is more or less south-west of target region 1120. In another example, anytime a lens region 1130 changes orientation in subregion 4, the digital image system may change the orientation of lens region 1130 such that the lens region 1130 is more or less north-west of target region 1120. Advantageously, embodiments of the invention provide for rotating the orientation of the lens region 1130 with respect to the target region 1120 to ensure that the lens region 1130 is fully depicted on display 1100. Thus, anytime lens region 1130 may be obscured on display 1100, such as when lens region 1130 is partially obscured by a border of display 1100, lens region 1130 may change orientation with respect to target region 1120 to ensure that the lens region 1130 is fully depicted on display 1100.

Other embodiments of the invention may employ different methods than those described above for determining where lens region 1130 should be rotated to with respect to target region 1120.

Step 1020 may be performed by depicting, over a period of time, movement of the lens region 1130 from a first position (position 1140) to a second position (position 1142) through one or more intermediate locations. Thus, the user is able to visually ascertain that the lens is being rotated to provide an unobscured view of lens region 1130, which prevents disorientation to the user from sudden movement of images on display 1200.

The lens region 1130 may display any visual information identified by target region 1120, and target region 1120 may be positioned anywhere on a display. For example, target region 1120 may be positioned over a floating controller (described in further detail below) to cause lens region 1130 to display visual information for an image displayed on the floating controller.

Target region 1120 may be positioned over any visual information displayed on a display. For example, target region 1120 may be positioned over a thumbnail image displayed on a display or over a thumbnail image displayed on a toolbar, such as a floating control 1310, described below. When target region 1120 identifies visual information associated with a thumbnail image, lens region 1130 displays visual information about the thumbnail image. For example, a photographer may position the target region 1120 over a thumbnail image displayed on a display. Thereafter the photographer may inspect visual information of the thumbnail image at the file image resolution by looking into the lens region 1130. In this way, the photographer can view the digital image of the thumbnail image at the exact resolution in

Displaying Images Using a Floating Controller

Figure 13:
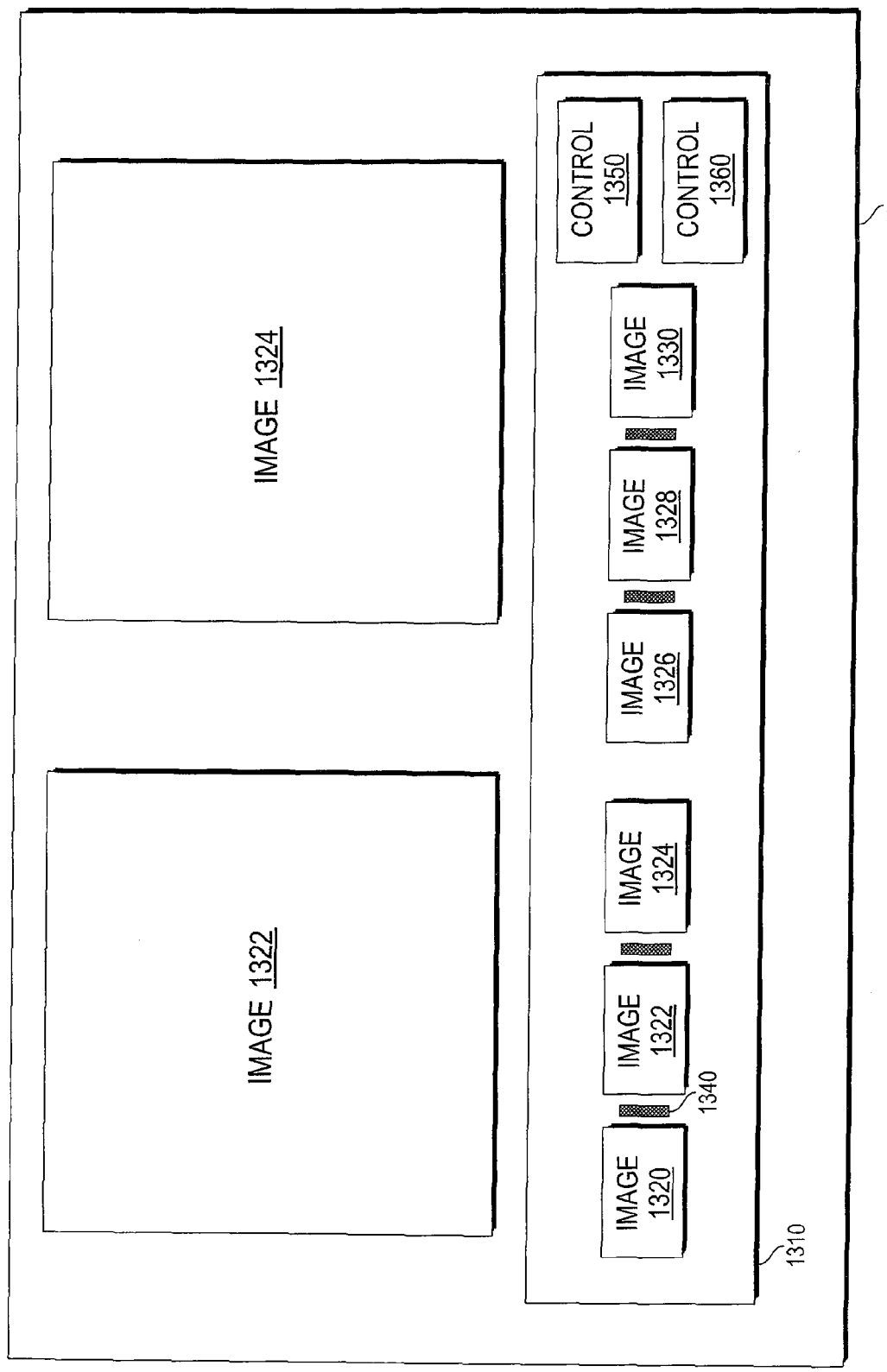
FIG. 13 is an illustration of a display with a floating controller according to an embodiment.

The digital image system of one embodiment of the invention may be used to display one or more digital images using a floating controller. FIG. 13 is an illustration of a display 1300 with a floating controller 1310 according to one embodiment of the invention. Digital image system may store data that describes how to render floating controller 1310 on display 1300. A user may select one or more images displayed on floating controller 1310 for display on display 1300. For example, floating controller 1310 may operate in a compare mode wherein two images (image 1322 and image 1324) are displayed on display 1300 side by side to facilitate comparison, as shown in FIG. 13. When floating controller 1310 is operating in compare mode, one image of the two displayed images remains fixed (for example, image 1324), while the user may submit user input to the digital image system to cause the digital image system to change the display of the other image (for example, image 1322) to a different image. In this way, the user may compare image 1324 against a variety of images displayed in the position occupied by image 1322.

Floating controller 1310 may also operate in a stack mode. Stack mode is similar to compare mode, (two images are shown on a display, wherein one of the images in a first position may be compared to multiple images shown, one at a time, in a second position) except that the image that does not move is the pick image of a group, stack, or version set, and the other images being compared belong to the same group, stack, or version set. Stack mode may be used to select a new pick image of a group, stack, or version set.

If not all the images that floating controller 1310 can display are shown on floating controller 1310, then the user may submit user input to digital image system via controls which are on floating controller 1310 to cause the digital image system to scroll through the images so that the user may view all images that floating controller 1310 can display.

Floating controller 1310 need not have any boundary that is adjacent to any boundary of display 1300. For example, A user may cause floating controller 1310 to be displayed anywhere on display 1300, including a position wherein floating controller 1310 is not adjacent to any boundary of display 1300, but rather is displayed on display 1300 without being adjacent or associated with any boundary of any screen, window, or application. Floating controller 1310 may also be positioned over one or more images on display 1300. For example, floating controller 1310 may wholly or partially obscure one or more of image 1322 and image 1324.

The user may position floating controller 1310 anywhere on display 1300, including a different orientation (such as horizontally or vertically). A user may cause floating controller 1310 to be displayed vertically on display 1300, rather than horizontally as shown in FIG. 13. Floating controller 1310 may be rotated by the user from either a vertical orientation to a horizontal orientation, or a horizontal orientation to a vertical orientation. In one embodiment of the invention, if the floating controller 1310 is dragged near the boundary of display 1300, then the orientation of floating controller 1310 may automatically be adjusted to correspond the orientation of the boundary of display 1300. For example, if floating controller 1310 is currently displayed vertically, and the user drags floating controller 1310 within a configurable distance of a horizontal boundary of display 1300, then floating controller 1310 may automatically be displayed horizontally on display 1300. The size of floating controller 1310 may also be configured by the user.

When the digital image system receives user input that specifies that the size, shape, orientation, or location of floating controller 1310 is to be changed, the digital image system (a) updates data that describes the size, shape, orientation, and location of floating controller 1310 to reflect the user input, and (b) updates the display 1300 to reflect the new size, shape, orientation, or location of floating controller 1310 as indicated in the received user input.

Displaying and Hiding the Display of the Floating Controller

In one embodiment of the invention, floating controller 1310 is continually displayed as long as a pointer, controlled by a user input device, displayed on display 1300 is located over floating controller 1310. The user may move the display of the pointer on display 1300 using input device 2014 or cursor control 2016. Digital image system stores and updates data that describes the current location of the pointer on the display 1300.

When the pointer is moved off the floating controller 1310, idle periods are tracked. An idle period is a period of time during which no user input of any type is received, e.g., no input is received via input device 2014 or cursor control 2016. If, while the pointer is off the floating controller 1310, the idle period exceeds a predetermined threshold duration, the floating controller 1310 is hidden (the floating controller 1310 is no longer displayed on display 1300). The predetermined threshold duration may be configured by the user using controls displayed on floating controller 1310. If floating controller 1310 is hidden during an idle period, then floating controller 1310 is redisplayed on display 1300 in response to the end of the idle period.

Displaying Images in a Group, Stack, or Version Set on a Floating Controller

Images in a sequence may be displayed on floating controller 1310. If one image has an association with another image, e.g., both images belong to a stack, a group, or a version set, then digital image system may display a visual indicator on display 1300 to identify the association to the user. For example, digital image system displays a visual indicator 1340 between image 1320, image 1322, and image 1324, as well as a visual indicator 1340 between image 1326, image 1328, and image 1330. In another embodiment (not depicted), a different visual indicator may be used for a group, a stack, or a version set to allow the user to identify the particular association (whether the association is a group, a stack, or a version set) between a set of images that each have a visual indicator.

A user may select on image of the sequence of images displayed on floating controller 1310. In one embodiment, when a user selects a new image of the sequence of images displayed on floating controller 1310, the digital image system may center the display of the sequence of images on the selected image on floating controller 1310. In another embodiment, when a user selects a new image of the sequence of images displayed on floating controller 1310, the digital image system may center the sequence of on the group, stack, or version set associated with the selected image. In another embodiment, the digital image system does not center the display of the sequence of images on the selected image when the user selects the selected image if the selected image is in the same group, stack, or version set as the formerly selected image. For example, if image 1322 was selected, and thereafter the user caused image 1324 to be selected, then the digital image system would not center the display of the sequence of images on image 1324. On the other hand, if image 1324 is selected, and thereafter the user caused image 1326 to be selected, then the digital image system causes the display of the sequence of images to be centered around image 1326 or the group, stack, or set of versions containing image 1326.

Using Rating Values with a Floating Controller

Floating controller 1310 may contain a ratings control 1350. A user may configure ratings control 1350 to transmit user input that assigns a rating value to each image displayed on floating controller 1310. Digital image system stores data that identifies the rating value of a particular image when the user transmits user input to digital image system that associates the rating value with the particular image. The rating value assigned to a particular image may be one of a sequence of rating values. The user may assign the rating value based on different criteria, e.g., how well he or she liked or disliked a particular image.

A user may configure floating controller 1310 to display images on display 1300 that meet or exceed a specified rating value. A user may submit user input to digital image system through ratings control 1350 displayed on floating controller 1310 to cause images that are assigned a rating value at least as high as a specified ratings value in the user input to be displayed on display 1300. In response, digital image system selects a subset of images, based, at least in part, on the particular rating value, the sequence of the rating values, and the rating values assigned to each image of the plurality of images. The digital image system may also select the subset of images whenever the user causes the floating controller 1310 to be displayed.

After digital image system determines which images are assigned a rating value that meets or exceeds the particular rating value, those images may be displayed on display 1300. In another embodiment, a user may use floating controller 1310 to only display on display 1300 those images that are assigned a rating value that is exactly the same as the specified rating value. In other embodiment, a user may use floating controller 1310 to only display on display 1300 those images that are assigned a rating value that conforms to a set of criteria specified by the user by configuring the ratings control 1350.

Ratings control 1350 allow a user to submit user input to digital image system to cause the rating value currently assigned an image to be changed. When the digital image system receives user input that specifies that the rating value assigned to an image is to be changed to a new value, the digital image system updated data that the digital image system stores that describes the rating value of that image to reflect the new value. If the rating value of a particular image is changed, then the particular image may be removed from the set of images displayed on display 1300 if the new rating value does not meet the criteria of those images currently displayed on display 1300.

In one embodiment of the invention, floating controller 1310 may be configured by the user to display one or more images in accordance with a particular set of ratings values whenever floating controller 1310 is initially executed. For example, when floating controller 1310 is initially executed by digital image system, floating controller 1310 may display one or images that correspond to a specified set of ratings values.

Searching for Images Using a Floating Controller

Floating controller 1310 also includes search controls 1360, which may be configured by a user to submit user input to the digital image system to cause the digital image system to search through a plurality of images to determine which of the plurality of images are associated with one or more search terms contained within the user input. Each image stored by the digital image system may be associated with information that may be the subject of one or more search terms automatically. For example, information about each image that is available to digital image system, such as the date of creation, the size of the image, the application the image was created by, may be automatically associated by the digital image system to the image. Other information may be associated with each image by the user by configuring search control 1360 to submit user input to the digital image system to cause the digital image system to associate the information, e.g., a title, a description of the image, or the purpose of the image, with an image.

A user may submit user input to the digital image system by configuring search controls 1360 to determine which images in a plurality of images correspond to a plurality of search terms contained within the user input. Upon receiving the user input, the digital image system determines which images correspond to the plurality of search terms. Thereafter, for each search term in the plurality of search terms that corresponds to at least one image in the plurality of images, the digital image system displays, on display 1300, an image that indicates a particular search term in the plurality of search terms that corresponds to at least one image in said plurality of images. For example, if a user want to search on two search terms, namely size and creation date, and only the creation date search term resulted in a match, then digital image system displays an image that is associated with the creation date search term.

A user may select any displayed image associated with a search term to view the search results associated with that search term. For example, if the user selected the creation date search term image displayed on the display, then the digital image system presents those images that matched the creation date search term.

Displaying a Sequence of Images

Floating controller 1310 may display a bounded sequence of images. The bounded sequence of images that are displayable on floating controller 1310 may contain more images than can be displayed on floating controller 1310 at the same time. Consequently, floating controller 1310 may contain controls that allow a user to scroll through the images displayed on floating controller 1310.

The bounded sequence of images displayed on floating controller 1310 may be visually depicted in a manner that indicates to the user whether the bounded sequence of images is at either the beginning or the end, or whether additional images in the bounded sequence may be displayed by scrolling further in one direction or another. In one embodiment of the invention, when an image in the bounded sequence is at either the beginning or the end of the bounded sequences of images, that image may be fully depicted without modification. On the other hand, when an image in the bounded sequence is not at either the beginning or the end of the bounded sequences of images, that image may be depicted with a modification, e.g., the image may be shown partially shaded.

Figure 14:
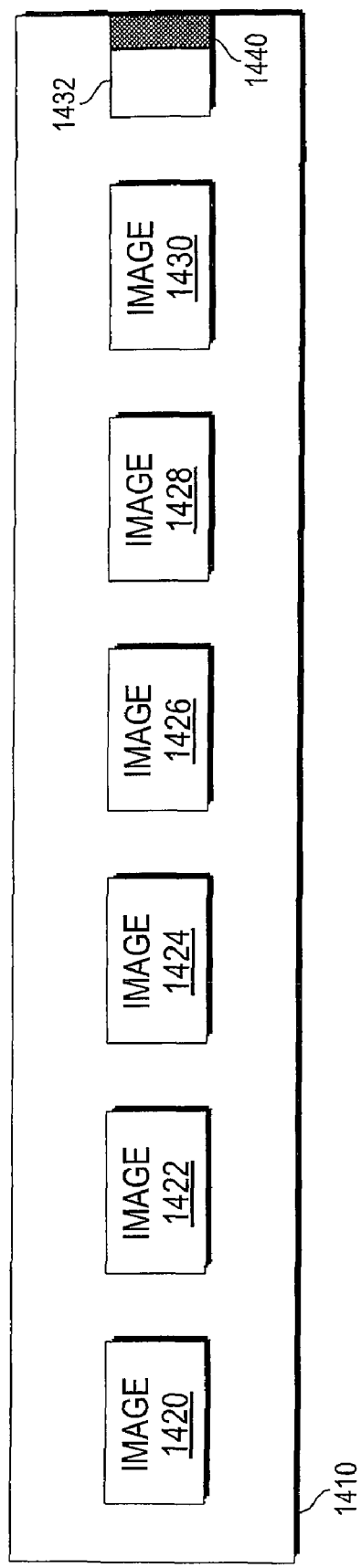
FIG. 14 is an illustration of a bounded sequence of images according to an embodiment.

FIG. 14 is an illustration 1400 of a bounded sequence of images according to one embodiment of the invention. While images of the bounded sequence of images of FIG. 14 are displayed on floating controller 1410, the sequences of image need not be displayed on a floating controller. Images 1420-1432 belong to a bounded sequence of ten images, wherein images 1420, 1422, 1424, 1426, 1428, 1430, and 1432 are displayed (fully or partially) on floating controller 1410 of FIG. 14, and wherein images 1434, 1436, and 1438 are not displayed on floating controller 1410. Image 1420 is the start of the bounded sequence, and image 1438 is the end of the bounded sequence.

Digital image system may render images differently on a display in some circumstances. When an image in the bounded sequence of images is depicted is the first or last image displayed, and the image is at either the beginning or the end of the bounded sequence of images, then the image may be fully depicted, without modification, to signal to the view that the image is at the beginning or end of the bounded sequence of images. Image 1420 is fully depicted without modification, thus informing the viewer that image 1420 is the beginning of the sequence of bounded images. When an image in the bounded sequence of images is depicted is the first or last image displayed, and the image is not at either the beginning or the end of the bounded sequence of images, then the image may be depicted with a visual indicator to signal to the view that the image is not at the beginning or end of the bounded sequence of images. Image 1432 is depicted with visual indicator 1440 to inform the view that image 1432 is not the end of the sequence of bounded images. Visual indicator 1440 may be visually depicted in a variety of different ways, e.g., by shading a portion of the image, by including shading adjacent to the image, by changing the color of the image, and inclusion of a label, icon, or image.

The visual indicator 1440 may be updated as a user scrolls through the bounded sequence of images. When a user scrolls through the bounded sequence of images, at least a portion of a first image is ceased to be displayed. Contemporaneously, a previously undisplayed portion of a second image is displayed. A visual indication is then displayed that indicates whether displaying the previously undisplayed portion fully displays a visual depiction that corresponds to an item at a particular position within the bounded sequence. In one embodiment of the invention, the particular position is the beginning or end of the bounded sequence of images. In other embodiment of the invention, the particular position includes another position besides the beginning or end of the bounded sequences of images, such as the image that is in the middle of the bounded sequence of images.

As the bounded sequence of images may be presented to the user in a variety of different ways, e.g., horizontal or vertical, the user may scroll through the bounded sequence of images either horizontally or vertically, depending on how the bounded sequence of images are displayed.

Displaying Images on More than One Display

Figure 15:
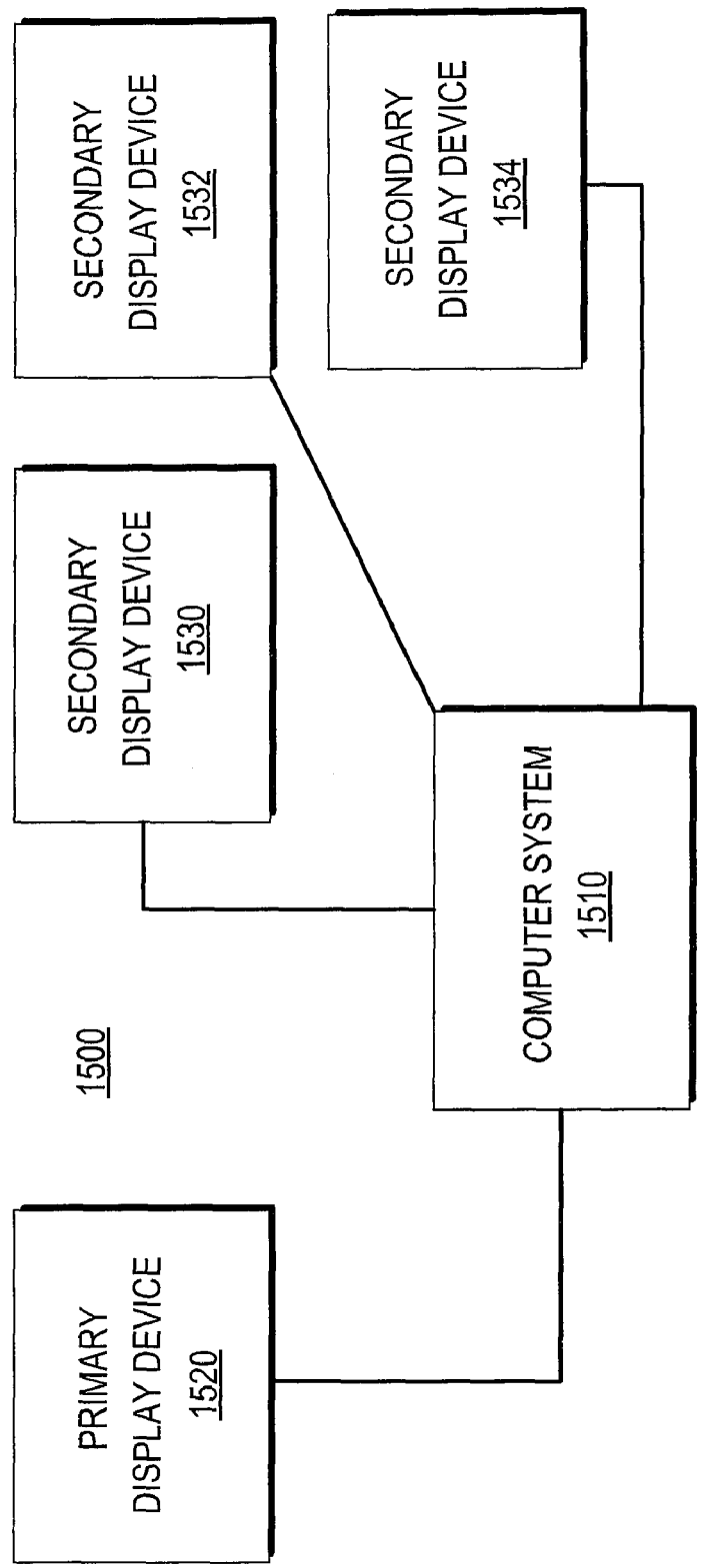
FIG. 15 is a block diagram of a digital image system that may be used to display images on more than one display according to an embodiment.

The digital image system of one embodiment of the invention may be used to display images on more than one display. FIG. 15 is a block diagram of a digital image system 1500, according to one embodiment of the invention, which may be used to display images on more than one display. Digital image system 1500 includes a computer system 1510, a primary display device 1520, and secondary display devices 1530, 1532, and 1534. While only three secondary display devices are shown in FIG. 15, digital image system 1500 may comprises any number of secondary display devices, including one or more. Computer system 1510 may be implemented using any component capable of causing a digital image to be displayed on the primary display device 1520 and each secondary display device. The primary display device 1520 and each secondary display device 1530, 1532, and 1534 may be implemented using any component that may display digital images, such as a CRT or a projector.

On a primary display device 1520 of a computer system 1510, the computer system 1510 generating a display. If computer system 1510 is in a first mode, then on secondary display device 1530, 1532, and 1534, computer system 1510 generates the same display that is concurrently being displayed on the primary display device 1520. On the other hand, if computer system 1510 is in a second mode, then on secondary display device 1530, 1532, and 1534, computer system 1510 generates a different display than the display that is concurrently being displayed on the primary display device 1520.

The user may transmit user input to computer system 1510 to switch computer system 1510 between the first mode and the second mode. The user may submit user input to digital image system by a variety of mechanisms, such as input device 2014 and cursor control 2016. The user may wish to switch between the first mode and the second mode to assist the presentation of material to viewers of the secondary display devices 1530, 1532, and 1534.

In one embodiment of the invention, when the computer system is in the second mode, the display generated on the primary display device includes a graphical user interface object, such as a floating toolbar, that is not displayed on the one or more secondary display devices 1530, 1532, and 1534. The graphical user interface object has controls for selecting what is shown on said one or more secondary display devices.

Scrolling Through Images in a Grid

The digital image system of one embodiment of the invention may be used to automatically advance one or more rows or columns in a grid when scrolling through digital images of a sequence of images that are arranged in a set of rows or columns. FIG. 16 is an illustration of a display 1600 that shows a sequence of digital images arranged in a series of rows according to one embodiment of the invention. Display 1600 is sized such that only two rows may be visually presented on display 1600 at a time. Accordingly, only images in row 2 and row 3 are shown on display 1600. Row 1 and row 4 are currently not displayed on display 1600.

A user may scroll through the sequence of digital images either horizontally (moving from column to column) or vertically (moving from row to row). In the display 1600 of FIG. 16, the user scrolls through the sequence of images vertically (row to row), since each images in each column may be displayed on display 1600, but not all the rows of images in the sequence of images may be displayed at once on display 1600. The techniques described below are applicable when a user scrolls through the grid of images either horizontally or vertically. Thus, the approach below shall be discussed in terms of a line of images, which is a set of images either vertically or horizontally aligned on a display. For example, row 1, row 2, row 3, column 1, column 2, and column 3 are each a line of images.

In one embodiment of the invention, a displayed set of images from a sequence of images is displayed on a display view to a user. For example, row 2 and row 3 are displayed on display 1600, and images in row 2 and row 3 of part of a sequence of images, namely images 1602-1640. The sequence of images includes one or more undisplayed images that are not displayed, e.g., images in 1 and row 4.

The user may submit user input to digital image system via input device 2014 and/or cursor control 2016 that selects a particular image from the set of displayed images (images in row 2 and row 3). For example, user input could be received by the digital image system that selects image 1614, wherein image 1624 was previously selected.

In response to receiving user input that selects a newly selected image, digital image system determines if the number of lines, in the displayed set of images, that precede the line containing the newly selected image is less than a first predetermined threshold. The first predetermined threshold is a configurable number of lines that are to be displayed, if available, before the line containing the newly selected image. The digital image system maintains data that identifies the first predetermined threshold. The user may submit user input to the digital image system to cause the first predetermined threshold to be updated to reflect a new number of lines.

If the digital image system determines that the number of lines, in the displayed set of images, that precede the line containing the newly selected image are less than a first predetermined threshold, then the digital image system causes a line of undisplayed images that precede the displayed set of images to be displayed, and ceases to display a line of displayed images that follow the newly selected image. In this example, if user input is received that selects image 1614, and if the predetermined threshold indicates that one line of images is to be displayed, if available, before the line containing the selected image (in this example, row 2), then digital image system causes an additional line of images that precede the line containing the selected image 1614 to be displayed, e.g., the digital image system will display row 1 on display 1600, and cease to display row 3 on display 1600.

Additionally, in response to receiving user input that selects a newly selected image, digital image system determines if the number of lines, in the displayed set of images, that follow the line containing the newly selected image is less than a second predetermined threshold. The second predetermined threshold is a configure number of lines that are to be displayed, if available, after the line containing the newly selected image. The digital image system maintains data that identifies the second predetermined threshold. The user may submit user input to the digital image system to cause the second predetermined threshold to be updated to reflect a new number of lines.

If the digital image system determines that the number of lines, in the displayed set of images, that follow the line containing the newly selected image is less than the second predetermined threshold, then the digital image system causes a line of undisplayed images that follow the displayed set of images to be displayed, and ceases to display a line of displayed images that precede the newly selected image. For example, if user input is received that selects image 1624, and if the second predetermined threshold indicates that at least one line of images is to be displayed, if available, after the line containing the newly selected image, then an additional line of images that follow the selected image 1624 may be displayed (row 4), and one line of images may be ceased to be displayed (row 1).

The newly selected image need not be in the line that is next to a newly added line. For example, if the newly selected image is image 1614, and if the first predetermined threshold is three lines, then if three lines are not displayed before the newly selected image, then three lines may be added to the display by digital image system.

In one embodiment of the invention, after a line of images has been added to the displayed set of images, all lines of displayed images, other than the line that ceases to be displayed, are shifted to make room for the newly displayed line. For example, if a line of images is added to the displayed set of images (row 4), and row 2 ceases to be displayed, then row 3 may be shifted to accommodate the addition of row 4.

In one embodiment of the invention, the first predetermined threshold and the second predetermined threshold may be expressed in terms of a number of images in a line, rather than a number of lines. For example, in this embodiment, in response to receiving user input that selects a newly selected image, digital image system determines (a) if the number of images, in the displayed set of images, that precede the newly selected image is less than the first predetermined threshold, and (b) if the number of images, in the displayed set of images, that follow the newly selected image is less than the second predetermined threshold.

Unpiling and Repiling a Pile of Images

Figure 17:
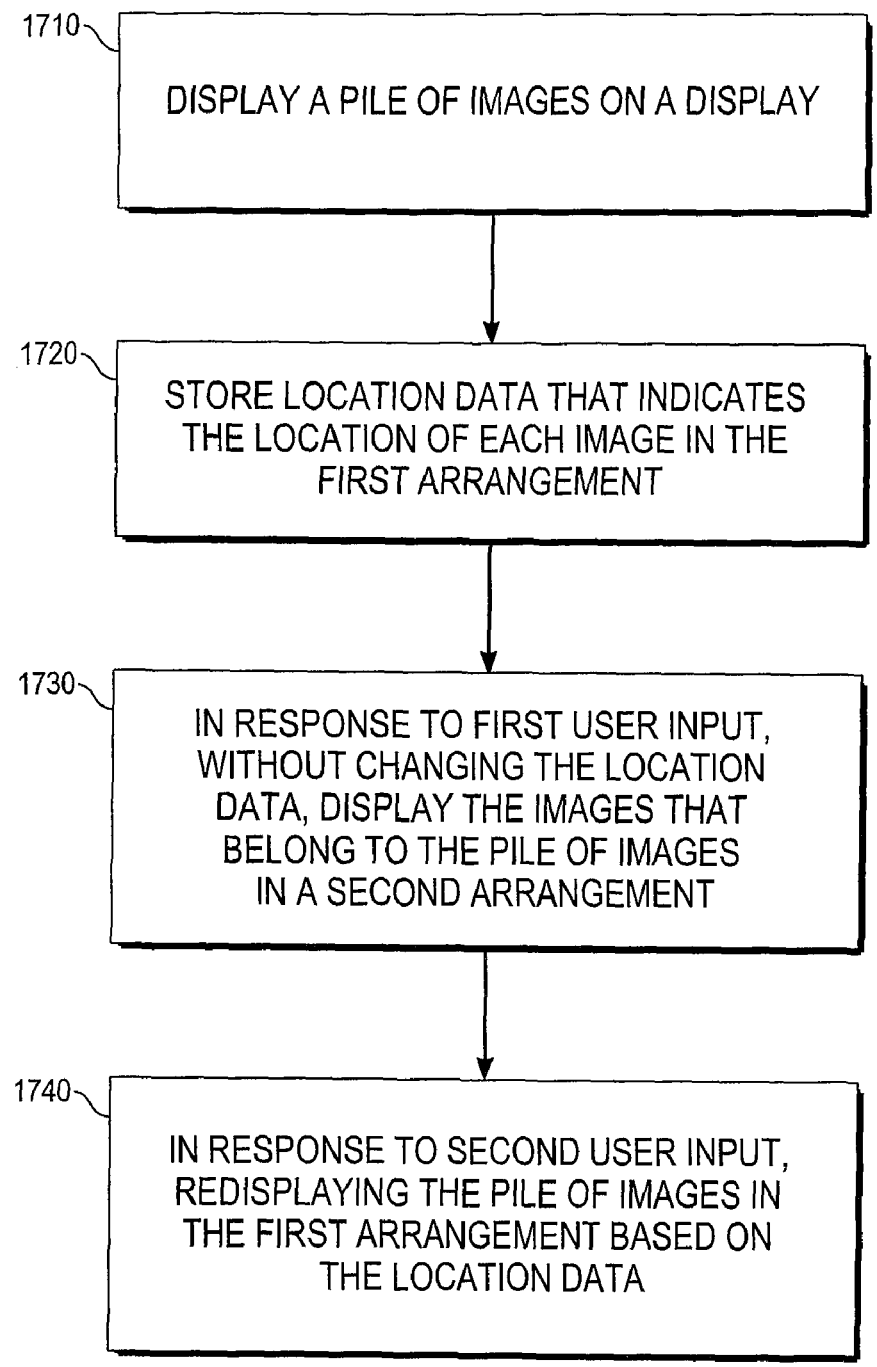
FIG. 17 is a flowchart illustrating the steps of viewing each of a set of digital images in an unobscured manner according to an embodiment.

The digital image system of one embodiment of the invention may be used to view each of a set of digital images unobscured when one or more of the set of digital images is displayed on a display in an obscured manner. For example, a digital image shown on a display may be obscured if a portion of the digital image is behind another digital image. FIG. 17 is a flow chart illustrating the steps of viewing each of a set of digital images in an unobscured manner according to one embodiment of the invention. In step 1710, a pile of images is displayed on a display. The pile of images includes a plurality of images arranged in a first arrangement in which at least one image in the pile overlaps with at least one other image in the pile. The digital image system may perform step 1710 by displaying the pile of images on a display. The pile of images displayed in step 1710 may be generated from images stored by the digital image system.

Figure 18:
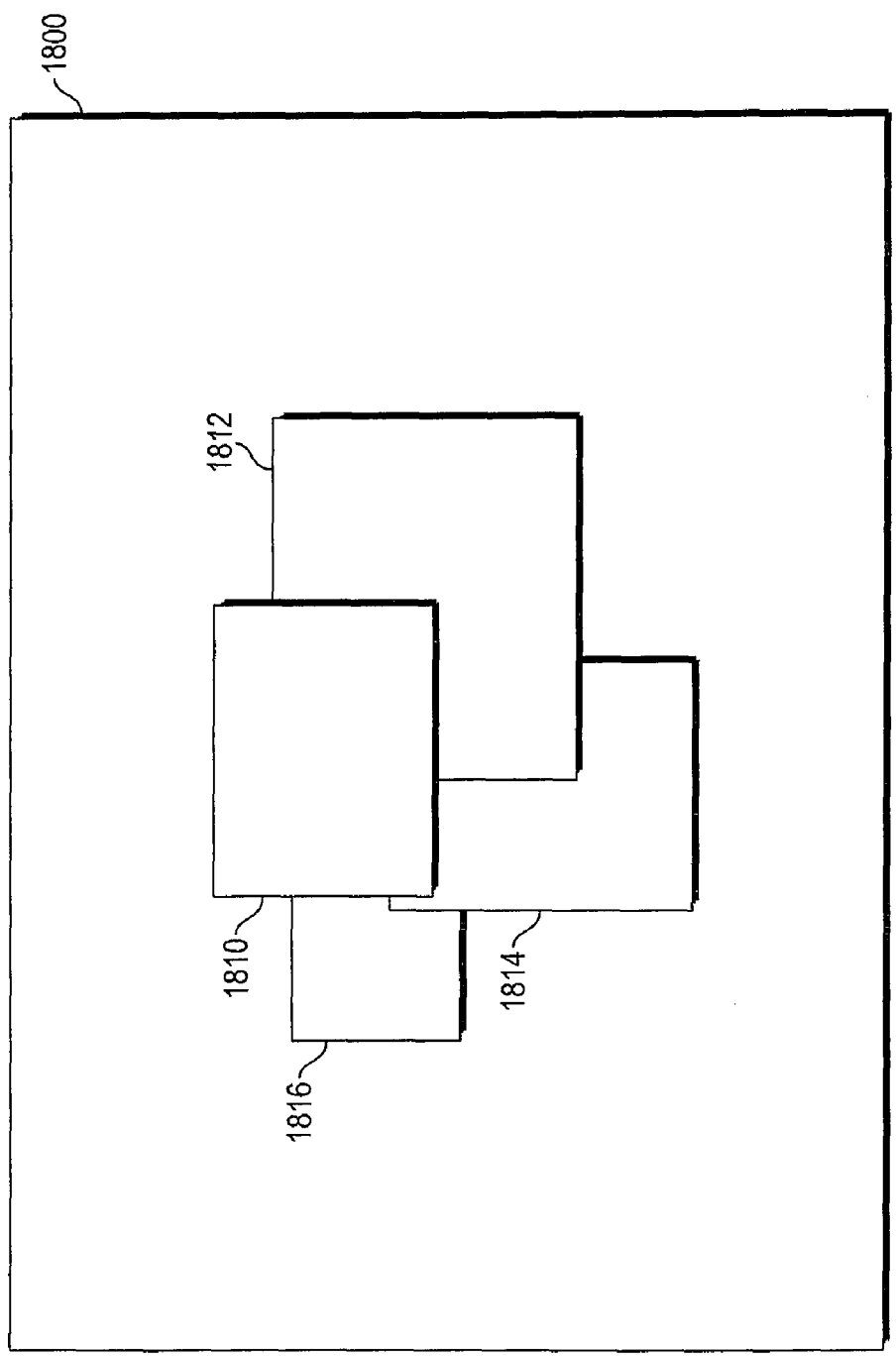
FIG. 18 is an illustration of a first display showing a set of images wherein at least one of the set of images is at least partially obscured according to an embodiment.

FIG. 18 is an illustration of a first display 1800 showing a set of images wherein at least one of the set of images is at least partially obscured according to one embodiment of the invention. The display 1800 of FIG. 18 may result after the performance of step 1710. While most images in the pile of images displayed on display 1800 overlap another image, any number of images in the pile of images displayed in step 1710 may be partially obscured or may overlap another image. After the performance of step 1710, processing proceeds to step 1720.

In step 1720, location data that indicates the location of each image in the first arrangement is stored. The location data may be stored by the digital image system. After the performance of step 1720, processing proceeds to step 1730.

In step 1730, in response to receiving a first set of user input while the images of the pile are displayed in the first arrangement of step 1710, without changing the location data, the images that belong to the pile of images are displayed by the digital image system on a display in a second arrangement. The second arrangement displays each image in the set of images without overlapping the image with another image in the set of images.

Figure 19:
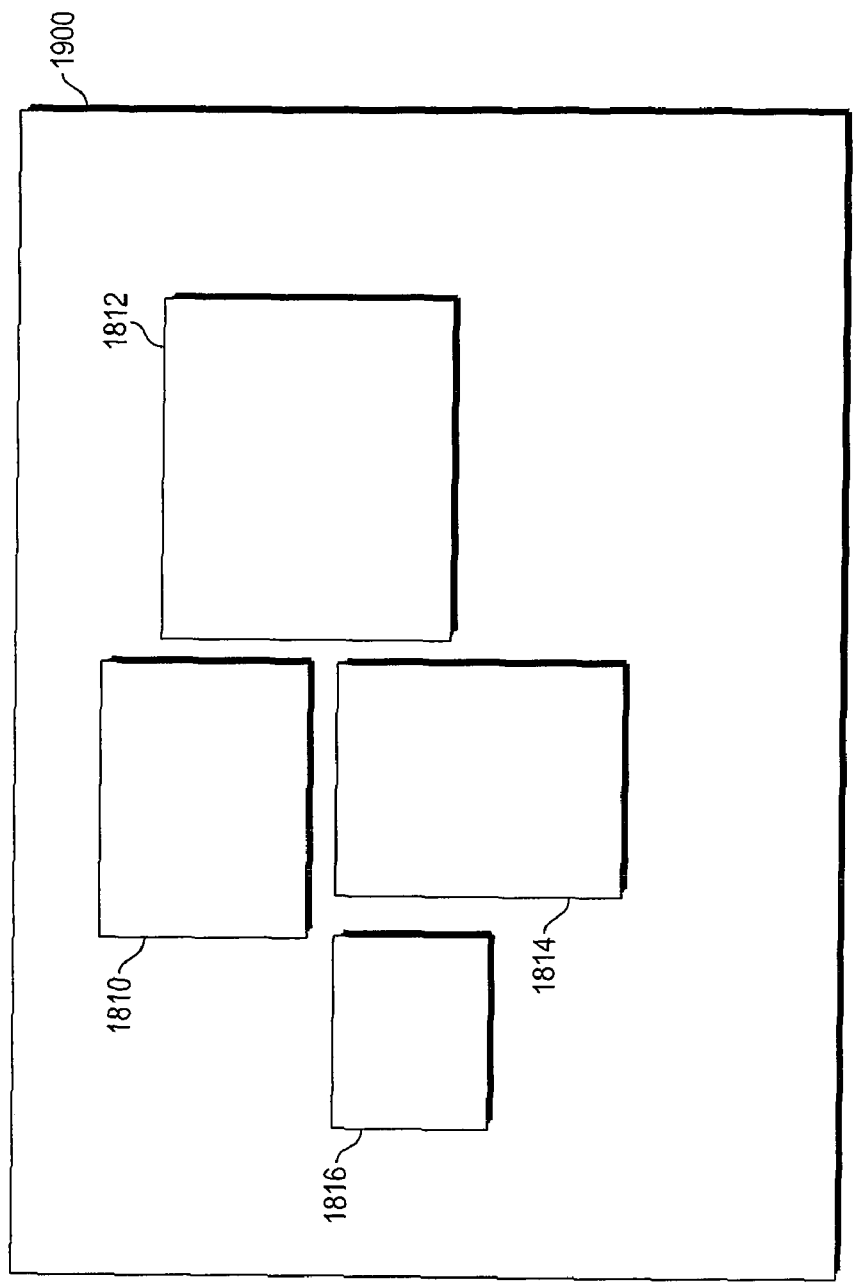
FIG. 19 is an illustration of a second display showing the set of images of FIG. 18 in an unobscured manner according to an embodiment.

FIG. 19 is an illustration of a second display 1900 showing the set of images of FIG. 18 in an unobscured manner that may result after the performance of step 1730. The second arrangement may be determined using various algorithms to determine where to move each image so that each image in the set of images does not obscure or overlap another image in the set of images, e.g., the amount of movement experienced by each image may be minimized. The user may move any image in the second arrangement (e.g., by dragging and dropping it); however, moving an image causes the location data to be updated to reflect the new location of the image. After the performance of step 1730, processing proceeds to step 1740.

In step 1740, in response to receiving a second set of user input while the images of the pile are displayed in the second arrangement, the pile of images are displayed on a display by the digital image system in the first arrangement based on the location data. As a result of performing step 1740, the pile of images will be visually depicted on a display as shown in FIG. 18.

Such an embodiment advantageously allows a user to view each image in a pile without moving any image in the pile. Consequently, a user may manage a set of displayed images with greater confidence as the user may visually ascertain the nature of each image, even if the display of the image is momentarily obscured by other images.

Implementation Mechanisms

Figure 20:
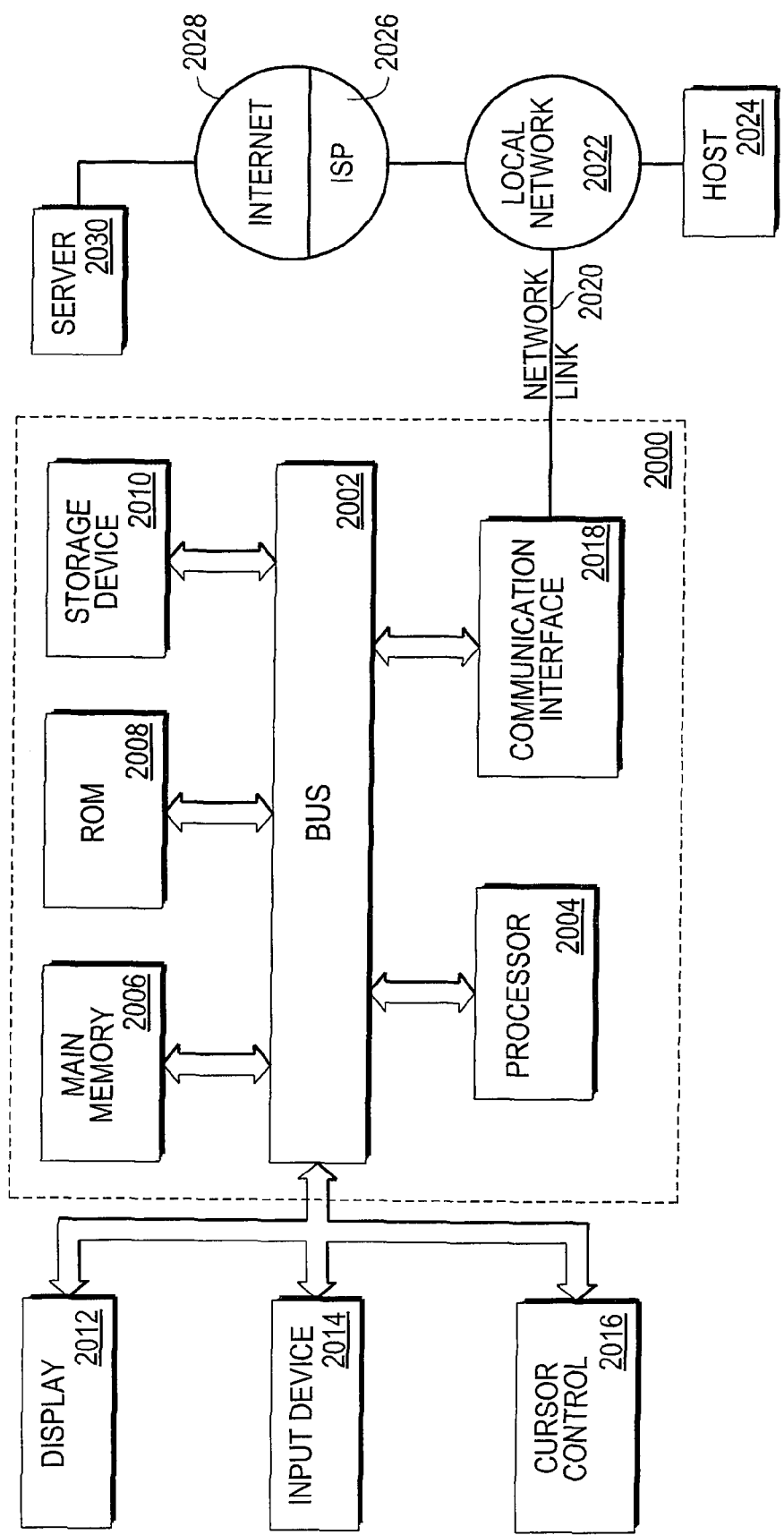
FIG. 20 is a block diagram that illustrates a computer system upon which an embodiment of the invention may be implemented.

The digital image system of an embodiment may be implemented using a computer system. FIG. 20 is a block diagram that illustrates a computer system 2000 upon which an embodiment of the invention may be implemented. As explained in further detail below, a user may use computer system 2000 to view digital images on display 2012, store digital images in storage device 2010, and interact with display 2012 with either input device 2014 or cursor control 2016. Computer system 2000 includes a bus 2002 or other communication mechanism for communicating information, and a processor 2004 coupled with bus 2002 for processing information. Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Computer system 2000 further includes a read only memory (ROM) 2008 or other static storage device coupled to bus 2002 for storing static information and instructions for processor 2004. A storage device 2010, such as a magnetic disk or optical disk, is provided and coupled to bus 2002 for storing information and instructions.

Computer system 2000 may be coupled via bus 2002 to a display 2012, such as a cathode ray tube (CRT), computer monitor, web page, or any graphical interface, for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

The invention is related to the use of computer system 2000 for implementing the techniques described herein. According to one embodiment of the invention, those techniques are performed by computer system 2000 in response to processor 2004 executing one or more sequences of one or more instructions contained in main memory 2006. Such instructions may be read into main memory 2006 from another machine-readable medium, such as storage device 2010. Execution of the sequences of instructions contained in main memory 2006 causes processor 2004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 2000, various machine-readable media are involved, for example, in providing instructions to processor 2004 for execution. Such a medium may take many forms, including but not limited to, non-volatile media, volatile media, and transmission media. Non-volatile media includes, for example, optical or magnetic disks, such as storage device 2010. Volatile media includes dynamic memory, such as main memory 2006. Transmission media includes coaxial cables, copper wire and fiber optics, including the wires that comprise bus 2002. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 2004 for execution. For example, the instructions may initially be carried on a magnetic disk of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are exemplary forms of carrier waves transporting the information.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution. In this manner, computer system 2000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for viewing, on a portion of a display, a sequence of items, the method comprising:
    displaying on the portion of the display, in a scrollable sequence, one or more items from the sequence of items;
    receiving user input to perform a scroll operation to scroll through the sequence of items;
    in response to receiving the user input:
        determining that the scroll operation will cause a particular item, which was not displayed on the portion of the display prior to receiving the user input, to be displayed on the portion of the display;
        determining whether the particular item is an end item, wherein an end item is an item that is at either end of the sequence of items;
        if the particular item is an end item, then displaying the particular item without a visual indicator; and
        if the particular item is not an end item, then displaying the particular item with the visual indicator;
    wherein the steps of receiving, determining, and displaying are performed by a computing device.

2. The method of claim 1 wherein the portion of the display is a toolbar.

3. The method of claim 1, wherein displaying the particular item with the visual indicator includes at least one of:
    shading a particular portion of the particular item;
    displaying shading adjacent to the particular item;
    changing a color of the particular item;
    labeling the particular item; or
    displaying an icon on top of the particular item.

4. The method of claim 1, further comprising in response to receiving the user input to perform the scroll operation to scroll through the sequence of items, ceasing to display one item on the portion of the display.

5. The method of claim 1, wherein the sequence of items is displayed between two endpoints of the portion of the display, and the particular item is displayed at a location on an endpoint of the portion of the display.

6. The method of claim 1, wherein an association indicator is displayed on the display to indicate that two displayed items of the sequence of items are part of a same group, a same stack, or a same version set.

7. The method of claim 1, further comprising:
    displaying, on a first screen, a first enlarged image that corresponds to a first item of the sequence of items;
    displaying, on a second screen or the first screen, a second enlarged image that corresponds to a second item of the sequence of items;
    receiving selective user input to select a third item of the sequence of items; and
    in response to receiving the selective user input, ceasing to display the second enlarged image, and displaying, in place of the second enlarged image, a third enlarged image that corresponds to the third item.

8. The method of claim 7, wherein the first item is a pick image of a group, stack, or version set, and the third item belongs to a same group, stack, or version set as the first item.

9. The method of claim 1, wherein a control on the portion of the display allows for receiving additional user entry to indicate a rating value for an indicated item displayed on the portion of the display.

10. The method of claim 1, further comprising:
    receiving additional user input, through a control on the portion of the display, that specifies a threshold rating value; and
    in response to receiving the additional user input:
        displaying, on the portion of the display, only items from the sequence of items that have a rating value above the threshold rating value.

11. The method of claim 1, further comprising:
    receiving additional user input, through a control on the portion of the display, that specifies a specific rating value; and
    in response to receiving the additional user input:
        displaying, on the portion of the display, only items from the sequence of items that have a rating value equal to the specific rating value.

12. The method of claim 1, further comprising:
    receiving additional user input that specifies one or more search terms; and
    for each particular search term of the one or more search terms:
        if the particular search term is associated with an associated item, of the sequence of items, then displaying, on a screen, the associated item that is associated with the particular search term.

13. The method of claim 12, further comprising:
    receiving second additional user input that selects the item associated with the particular search term; and
    in response to receiving the second additional user input, displaying all items, of the sequence of items, that are associated with the particular search term.

14. A volatile or non-volatile medium storing one or more sequences of instructions which, when executed by one or more processors, causes the one or more processors to perform the method recited in claim 1.

15. A volatile or non-volatile medium storing one or more sequences of instructions which, when executed by one or more processors, causes the one or more processors to perform the method recited in claim 7.

16. A volatile or non-volatile medium storing one or more sequences of instructions which, when executed by one or more processors, causes the one or more processors to perform the method recited in claim 9.

17. A volatile or non-volatile medium storing one or more sequences of instructions which, when executed by one or more processors, causes the one or more processors to perform the method recited in claim 10.

18. A volatile or non-volatile medium storing one or more sequences of instructions which, when executed by one or more processors, causes the one or more processors to perform the method recited in claim 12.

19. A volatile or non-volatile medium storing one or more sequences of instructions which, when executed by one or more processors, causes the one or more processors to perform the method recited in claim 13.

20. A computer-implemented method for viewing a bounded sequence of items, comprising:

a computing device displaying, on a screen, a toolbar with two ends;

the computing device displaying on the toolbar one or more items from the bounded sequence of items, wherein the one or more items are arranged in a sequentially ordered display;

the computing device receiving user input to scroll through the bounded sequence of items, wherein the user input either indicates to scroll towards a beginning item of the bounded sequence of items or indicates to scroll towards an end item of the bounded sequence of items; and in response to receiving the user input to scroll through the bounded sequence of items, the computing device performing:

displaying a visual indicator on a displayed item of the bounded sequence of items if and only if (a) the displayed item is not the beginning item, (b) the displayed item is not the end item, and (c) the displayed item is displayed at one of the two ends of the toolbar.

21. A volatile or non-volatile medium storing one or more sequences of instructions which, when executed by one or more processors, causes the one or more processors to perform the method recited in claim 20.

* * * * *

UNITED STATES PATENT AND TRADEMARK OFFICE
CERTIFICATE OF CORRECTION

| | | |
|---|---|---|
| PATENT NO. | : 7,719,548 B2 | Page 1 of 1 |
| APPLICATION NO. | : 12/415831 | |
| DATED | : May 18, 2010 | |
| INVENTOR(S) | : Randy Ubillos et al. | |

It is certified that error appears in the above-identified patent and that said Letters Patent is hereby corrected as shown below:

In column 2, line 67, delete "rend" and insert -- end --, therefor.

In column 21, line 4, delete "1" and insert -- row 1 --, therefor.

Signed and Sealed this
Eighth Day of November, 2011

David J. Kappos
*Director of the United States Patent and Trademark Office*